(12) United States Patent
Wang et al.

(10) Patent No.: US 11,818,326 B2
(45) Date of Patent: Nov. 14, 2023

(54) METHODS AND APPARATUS FOR SIGNALING VIEWING REGIONS OF VARIOUS TYPES IN IMMERSIVE MEDIA

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

(*) Notice: Subject to any disclaimer, the term of this patent is extended or adjusted under 35 U.S.C. 154(b) by 0 days.

(21) Appl. No.: 17/316,093

(22) Filed: May 10, 2021

(65) Prior Publication Data

US 2021/0360219 A1 Nov. 18, 2021

Related U.S. Application Data

(60) Provisional application No. 63/023,906, filed on May 13, 2020.

(51) Int. Cl.
*H04N 13/161* (2018.01)
*H04N 13/111* (2018.01)
(Continued)

(52) U.S. Cl.
CPC ......... *H04N 13/161* (2018.05); *H04N 13/111* (2018.05); *H04N 13/178* (2018.05); *H04N 13/194* (2018.05); *H04N 19/597* (2014.11)

(58) Field of Classification Search
None
See application file for complete search history.

(56) References Cited

U.S. PATENT DOCUMENTS

2019/0104326 A1* 4/2019 Stockhammer ....... H04L 65/601
2020/0153885 A1   5/2020 Lee et al.
(Continued)

FOREIGN PATENT DOCUMENTS

WO    WO 2020/071703 A1    4/2020

OTHER PUBLICATIONS

[No Author Listed], Information technology—Coded representation of immersive media—Part 5: Video-based Point Cloud Compression, ISO/IEC JTC1/SC29/WG11/23090-5. Oct. 2019:185 pages.
(Continued)

*Primary Examiner* — Christopher Braniff
(74) *Attorney, Agent, or Firm* — Wolf, Greenfield & Sacks, P.C.

(57) ABSTRACT

The techniques described herein relate to methods, apparatus, and computer readable media configured to encode and/or decode video data. Immersive media data includes a set of one or more tracks, each track comprising associated immersive media data corresponding to an associated spatial portion of immersive media content and metadata specifying a six degree of freedom (6DoF) viewing region in the immersive media content, wherein the metadata comprises viewing region type data indicating a type of the viewing region. An encoding and/or decoding operation is performed based on the set of one or more tracks and the viewing region metadata to generate encoded and/or decoded immersive media data. The viewing region type data can be specified by a data structure attribute of the metadata specifying a viewing region and/or by an attribute of the metadata specifying a viewing region.

16 Claims, 31 Drawing Sheets

(51) Int. Cl.
H04N 13/178 (2018.01)
H04N 13/194 (2018.01)
H04N 19/597 (2014.01)

(56) References Cited

U.S. PATENT DOCUMENTS

2021/0377571 A1* 12/2021 Deshpande .......... H04N 19/174
2021/0409670 A1* 12/2021 Oh ................... H04N 21/23614

OTHER PUBLICATIONS

[No Author Listed], Information technology—Coded representation of immersive media—Part 10: Carriage of Video-based Point Cloud Compression Data, ISO/IEC JTC1/SC29/WG11/23090-10. Feb. 2020:46 pages.

[No Author Listed], Information technology—Coded representation of immersive media—Part 12: Immersive Video, ISO/IEC JTC1/SC29/WG11/23090-10; N19001. Feb. 2020:69 pages.

Oyman et al., On Client Feedback Signaling of Viewport Information. International Organisation for Standardisation, Coding of Moving Pictures and Audio, ISO/IEC JTC1/SC29/WG11/MPEG2019/m50655. Oct. 2019:7 pages.

Oyman et al., Signaling of Camera Information in V-PCC Carriage Format. International Organisation for Standardisation, Coding of Moving Pictures and Audio, ISO/IEC JTC1/SC29/WG11/MPEG2020/m53044. Apr. 2020:5 pages.

Wang et al., Evaluation Results for CE on Partial Access of Point Cloud Data. International Organisation for Standardisation, Coding of Moving Pictures and Audio, ISO/IEC JTC1/SC29/WG11/MPEG2017/m50606. Oct. 2019:10 pages.

Wang et al., On Surficial and Volumetric Viewports for Immersive Media. International Organisation for Standardisation, Coding of Moving Pictures and Audio, ISO/IEC JTC1/SC29/WG11/MPEG/m52494. Jan. 2020:6 pages.

Wang et al., On Metadata for Immersive Media Content for Viewport Dependent Media Processing. International Organisation for Standardisation, Coding of Moving Pictures and Audio, ISO/IEC JTC1/SC29/WG11/MPEG/m52974. Apr. 2020:9 pages.

Wang et al., On Definition of Viewports and their Signaling in ISOBMFF for Viewport Dependent Media Processing. International Organisation for Standardisation, Coding of Moving Pictures and Audio, ISO/IEC JTC1/SC29/WG11/MPEG/m53395. Apr. 2020:5 pages.

* cited by examiner

```
aligned(8) class 3DPositionStruct() {
    signed int(32) centre_x;    ← 811
    signed int(32) centre_y;    ← 812
    singed int(32) centre_z;    ← 813
}
```
← 810

FIG. 8A

```
aligned(8) class 3DOrientationStruct() {
    signed int(32) centre_azimuth;      — 821
    signed int(32) centre_elevation;    — 822
    singed int(32) centre_tilt;         — 823
}
```

```
aligned(8) class 2DRangeStruct(shape_type) {
    if (shape_type == 0) {            // 2D rectangle
        unsigned int(32) range_width;
        unsigned int(32) range_height;
    }
    if (shape_type == 1) {            // 2D circle
        unsigned int(32) range_radius;
    }
    if (shape_type == 2) {            // 3D spherical region in OMAF
        unsigned int(32) range_azimuth;
        unsigned int(32) range_elevation;
    }
    // other values of shape_type are reserved
}
```

FIG. 8C

```
aligned(8) ViewportWith6DoFStruct(
    position_included_flag,          ← 841
    orientation_included_flag,       ← 842
    range_included_flag,             ← 843
    shape_type,                      ← 844
    volumetric_flag,                 ← 845
    interpolate_included_flag)       ← 846
{
        if (position_included_flag)          ← 847
            3DPositionStruct();              ← 848
        if (orientation_included_flag)       ← 849
            3DOrientationStruct();           ← 850
        if (range_included_flag)             ← 851
            2DRangeStruct(shape_type);       ← 852
        if (volumetric_flag)                 ← 853
            signed int(32) viewing_depth;    ← 854
        if (interpolate_included_flag) {     ← 855
            unsigned int(1) interpolate;     ← 856
            bit(7) reserved = 0;             ← 857
        }
}
```
— 840

FIG. 8D

| Value | Description |
|---|---|
| 0 | 2D rectangle |
| 1 | 2D circle |
| 2 | 3D sphere region |
| others | Reserved |

FIG. 9

```
aligned(8) class ExtCameraInfoStruct() {
    unsigned int(10) camera_id;                    ← 1011
    unsigned int(1) camera_pos_present;            ← 1012
    unsigned int(1) camera_ori_present;            ← 1013
    if (camera_pos_present){
        signed int(32) camera_pos_x;               ← 1015
        signed int(32) camera_pos_y;               ← 1016
        signed int(32) camera_pos_z;               ← 1017
    }
    if (camera_ori_present){
        signed int(32) camera_quat_x;              ← 1019
        signed int(32) camera_quat_y;              ← 1020
        signed int(32) camera_quat_z;              ← 1021
    }
}
```

```
aligned(8) class IntCameraInfoStruct() {                              1030
    unsigned int(10) camera_id;                                       1031
    unsigned int(8) camera_type;                                      1032
    unsigned int(1) camera_proj_params_present;                       1033
    unsigned int(1) camera_depth_present;                             1034
    if (camera_type==0 && camera_proj_params_present){
        signed int(32) erp_horizontal_fov;                            1036
        signed int(32) erp_vertical_fov;                              1037
    }
    if (camera_type==1 && camera_proj_params_present){
        signed int(32) perspective_horizontal_fov;                    1039
        signed int(32) perspective_vertical_fov;                      1040
    }
    if (camera_type==2 && camera_proj_params_present){
        signed int(32) ortho_aspect_ratio;                            1042
        signed int(32) ortho_horizontal_size;                         1043
    }
    if (camera_depth_present){
        unsigned int(32) camera_near_depth;                           1045
        unsigned int(32) camera_far_depth;                            1046
    }
}
```

FIG. 10B

| Value | Description |
|---|---|
| 0 | unspecified (main): for use by applications |
| 1 | recommended (main): a viewport selected per the director's cut or recommendation, i.e., according to the creative intent of the content author or content provider |
| 2 | initial (main): a viewport selected for initial playback of the immersive content when no other viewport is selected |
| 3 | popular (main): a viewport selected based on its viewing popularity, or recommended by viewers, rather than by a content editor |
| 4 | user-selected (main): a viewport selected by a viewer when the viewer interacts with the immersive media content |
| 5..239 | reserved for future main viewport types |
| 240 | unspecified (secondary) |
| 241 | recommended (secondary) |
| 242 | initial (secondary) |
| 243 | popular (secondary) |
| 244 | user-selected (secondary) |
| 245..255 | reserved for future secondary viewport types |

FIG. 11

```
aligned(8) TypedViewportWith6DoFStruct(
    position_included_flag,           ← 1211
    orientation_included_flag,        ← 1212
    range_included_flag,              ← 1213
    shape_type,                       ← 1214
    volumetric_flag,                  ← 1215
    interpolate_included_flag)        ← 1216
{
    unsigned int(32) viewport_id;     ← 1217
    unsigned int(8) viewport_type;    ← 1218
    string viewport_description;      ← 1219

ViewportWith6DoFStruct(
        position_included_flag,       ← 1220
        orientation_included_flag,    ← 1221
        range_included_flag,          ← 1222
        shape_type,                   ← 1223
        volumetric_flag,              ← 1224
        interpolate_included_flag)    ← 1225
                                      ← 1226
}
```

```
aligned(8) TypedViewportWith6DoFStruct(){
    unsigned int(32) viewport_id;            ──── 1231
    unsigned int(8) viewport_type;           ──── 1232
    string viewport_description;             ──── 1233

ExtCameraInfoStruct();                   ──── 1234
    IntCameraInfoStruct();                   ──── 1235
}
```

```
aligned(8) RecommededViewportWith6DoFStruct(
    position_included_flag,        —— 1311
    orientation_included_flag,     —— 1312
    range_included_flag,           —— 1313
    shape_type,                    —— 1314
    volumetric_flag,               —— 1315
    interpolate_included_flag)     —— 1316
{
    unsigned int(32) viewport_id;  —— 1317
    string viewport_description;   —— 1318
    ViewportWith6DoFStruct(        —— 1319
        position_included_flag,    —— 1320
        orientation_included_flag, —— 1321
        range_included_flag,       —— 1322
        shape_type,                —— 1323
        volumetric_flag,           —— 1324
        interpolate_included_flag) —— 1325
}
```

```
aligned(8) RecommendedViewportWith6DoFStruct()
{
    unsigned int(32) viewport_id;        ← 1331
    string viewport_description;          ← 1332
    ExtCameraInfoStruct();                ← 1333
    IntCameraInfoStruct();                ← 1334
}
```
1330

FIG. 13B

```
aligned(8) RecommededViewportWith6DoFStruct(
    position_included_flag,                 — 1411
    orientation_included_flag,              — 1412
    range_included_flag,                    — 1413
    shape_type,                             — 1414
    volumetric_flag,                        — 1415
    interpolate_included_flag)              — 1416
{
    unsigned int(32) viewport_id;           — 1417
    unsigned int(8) viewport_type;          — 1418
    string viewport_description;            — 1419
    ViewportWith6DoFStruct(                 — 1420
        position_included_flag,             — 1421
        orientation_included_flag,          — 1422
        range_included_flag,                — 1423
        shape_type,                         — 1424
        volumetric_flag,                    — 1425
        interpolate_included_flag)          — 1426
}
```

FIG. 14A

```
aligned(8) RecommendedViewportWith6DoFStruct()
{
    unsigned int(32) viewport_id;         ——1431
    unsigned int(8) viewport_type;        ——1432
    string viewport_description;          ——1433
    ExtCameraInfoStruct();                ——1434
    IntCameraInfoStruct();                ——1435
}
```

```
aligned(8) InitialRecommededViewportWith6DoFStruct(
    position_included_flag,          — 1511
    orientation_included_flag,       — 1512
    range_included_flag,             — 1513
    shape_type,                      — 1514
    volumetric_flag,                 — 1515
    interpolate_included_flag)       — 1516
{
    unsigned int(32) viewport_id;    — 1517
    string viewport_description;     — 1518
    ViewportWith6DoFStruct(          — 1519
        position_included_flag,      — 1520
        orientation_included_flag,   — 1521
        range_included_flag,         — 1522
        shape_type,                  — 1523
        volumetric_flag,             — 1524
        interpolate_included_flag)   — 1525
}
```
↖ 1510

FIG. 15A

```
aligned(8) InitialRecommendedViewportWith6DoFStruct()
{
    unsigned int(32) viewport_id;          ⟵ 1531
    string viewport_description;           ⟵ 1532
    ExtCameraInfoStruct();                 ⟵ 1533
    IntCameraInfoStruct();                 ⟵ 1534
}
```
1530

FIG. 15B

Box Types: 'tvpt'
Container: VPCCSampleEntry ('vpc1' or 'vpcg')
Mandatory: No
Quantity: Zero or one

```
aligned(8) class TypedViewportWith6DoFBox extends
FullBox('tvpt',0,0) {
    unsigned int(16) num_viewports;           ------ 1610
    for (i=0; i < num_viewports; i++) {        ------ 1620
        TypedViewportWith6DoFStruct();         ------ 1630
    }
}
```

*Sample Entry*
Sample Entry Type: `'6dvp'`
Container:         Sample Description Box ('stsd')
Mandatory:         No
Quantity:          0 or 1

```
aligned(8) class 6DoFViewportSampleEntry
        extends MetadataSampleEntry ('6dvp') {
    bit(4) reserved = 0;
    unsigned int(1) position_included_flag;
    unsigned int(1) orientation_included_flag;
    unsigned int(1) range_included_flag;
    unsigned int(1) interpolate_included_flag;
    unsigned int(8) shape_type; // 0 or 1 for 2D shape of field of view
    TypedViewportWith6DoFStruct(position_included_flag,
            orientation_included_flag,
            range_included_flag,
            shape_type);
            interpolate_included_flag);
}
```

FIG. 18

*Sample Entry*
Sample Entry Type: '6dvp'
Container: Sample Description Box ('stsd')
Mandatory: No
Quantity: 0 or 1

```
aligned(8) class 6DoFViewportSampleEntry{
    unsigned int(16) num_viewports;                    ← 2010
    for (i=0; i < num_viewports; i++) {                ← 2020
        TypedViewportWith6DoFStruct();                 ← 2030
    }
}
```

```
Sample format
aligned(8) class 6DoFViewportSample(){
    unsigned int(16) num_viewports;          ── 2110
    for (i=0; i < num_viewports; i++) {      ─── 2120
        TypedViewportWith6DoFStruct();       ···· 2130
    }
}
```

| Parameter | | Type | Cardinality | Description |
|---|---|---|---|---|
| SelectedViewport 2202 | | Object | 1 | |
| | Timestamp 2204 | date-time | 1 | Wall-clock time corresponding to the signaled viewport values |
| | viewport_id 2206 | Int | 1 | Identifier associated with the signaled viewport |
| | viewport_type 2208 | Int | 1 | Type of the viewport as listed in the table in Section 1. |
| | viewport_description 2210 | string | 1 | A null-terminated UTF-8 string that provides a textual description of the viewport |
| | center_azimuth 2212 | Int: Range is [-180* $2^{-16}$, 180* $2^{-16}$] | 1 | Specifies the azimuth of the centre point of the viewport position in units of $2^{-16}$ degrees relative to the global coordinate axes. When not present, center_azimuth is inferred to be equal to 0. |
| | center_elevation 2214 | Int: Range is [-90* $2^{-16}$, 90* $2^{-16}$] | 1 | Specifies the elevation of the centre point of the viewport position in units of $2^{-16}$ degrees relative to the global coordinate axes. When not present, center_elevation is inferred to be equal to 0. |
| | center_tilt 2216 | Int: Range is [-180* $2^{-16}$, 180* $2^{-16}$] | 1 | Specifies the tilt angle of the viewport position, in units of $2^{-16}$ degrees, relative to the global coordinate axes. When not present, center_tilt is inferred to be equal to 0. |
| | azimuth_range 2218 | Int | 0,1 | Specifies the azimuth range of the sphere region through the centre point of the sphere region in units of $2^{-16}$ degrees. When not present, azimuth_range is inferred to be equal to 360 * $2^{16}$. Only relevant for 3D viewports |
| | elevation_range 2220 | Int | 0,1 | Specifies the elevation range of the sphere region through the centre point of the sphere region in units of $2^{-16}$ degrees. When not present, elevation_range is inferred to be equal to 180 * $2^{16}$. Only relevant for 3D viewports |
| | width_range 2222 | Int | 0,1 | Specifies the width range of the rectangular region through its center point. Only relevant for 2D viewports |
| | height_range 2224 | Int | 0,1 | Specifies the height range of the rectangular region through its center point. Only relevant for 2D viewports |
| | center_x 2226 | Int | 1 | Integer in decimal representation expressing the x-coordinate of the center point of the sphere or plane containing the viewport in arbitrary units |
| | center_y 2228 | Int | 1 | Integer in decimal representation expressing the y-coordinate of the center point of the sphere or plane containing the viewport in arbitrary units |
| | center_z 2230 | Int | 1 | Integer in decimal representation expressing the z-coordinate of the center point of the sphere or plane containing the viewport in arbitrary units |
| | object_id 2232 | Int | 0,1 | Integer expressing the object ID associated with the viewport. Object ID information may or may not be signalled in conjunction with the viewport coordinate information. |
| | Context 2234 | String | 0,1 | String describing the contextual information associated with the viewport, e.g., "ball", "player X", etc. Context information may or may not be signalled in conjunction with the viewport coordinate information |

FIG. 22

METHODS AND APPARATUS FOR SIGNALING VIEWING REGIONS OF VARIOUS TYPES IN IMMERSIVE MEDIA

RELATED APPLICATIONS

This application claims priority under 35 U.S.C. § 119(e) to U.S. Provisional Application Ser. No. 63/023,906, titled "METHOD OF SIGNALING VIEWPORTS OF VARIOUS TYPES FOR 3D IMMERSIVE MEDIA CONTENT," filed May 13, 2020, which is incorporated herein by reference in its entirety.

TECHNICAL FIELD

The techniques described herein relate generally to video coding, and particularly to methods and apparatus for signaling viewing regions of various types in immersive media.

BACKGROUND OF INVENTION

Various types of video content, such as 2D content, 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangle projection can be used to put the spherical map into a two-dimensional image. This can be done, for example, to use two-dimensional encoding and compression techniques. Ultimately, the encoded and compressed content is stored and delivered using a desired delivery mechanism (e.g., thumb drive, digital video disk (DVD) and/or online streaming). Such video can be used for virtual reality (VR), and/or 3D video.

At the client side, when the client processes the content, a video decoder decodes the encoded video and performs a reverse-projection to put the content back onto the sphere. A user can then view the rendered content, such as using a head-worn viewing device. The content is often rendered according to the user's viewport, which represents the angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder does not know what the user will actually view, then the whole encoding and decoding process will process the entire spherical content. This can allow, for example, the user to view the content at any particular viewport and/or area, since all of the spherical content is delivered and decoded.

However, processing all of the spherical content can be compute intensive and can consume significant bandwidth. For example, for online streaming applications, processing all of the spherical content can place a large burden on network bandwidth. Therefore, it can be difficult to preserve a user's experience when bandwidth resources and/or compute resources are limited. Some techniques only process the content being viewed by the user. For example, if the user is viewing the front (e.g., or north pole), then there is no need to deliver the back part of the content (e.g., the south pole).

If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for signaling viewing regions of various types for immersive media.

Some aspects relate to a decoding method for decoding video data for three-dimensional (3D) immersive media, the method comprising accessing immersive media data comprising a set of one or more tracks, wherein each track of the set comprises associated to-be-decoded immersive media data that corresponds to an associated spatial portion of immersive media content that is different than the associated spatial portions of other tracks in the set of tracks; and metadata specifying a six degree of freedom (6DoF) viewing region in the immersive media content, wherein the metadata comprises first viewing region type data indicating a type of the viewing region; and performing a decoding operation based on the set of one or more tracks and the viewing region metadata to generate decoded immersive media data for the viewing region.

In some embodiments, the viewing region comprises a sub-portion of the viewable immersive media data that is less than a full viewable portion of the immersive media data.

In some embodiments, the viewing region comprises a viewport.

In some embodiments, performing the decoding operation further comprises determining a type of the viewing region based on the first viewing region type data.

In some embodiments, the first viewing region type data is specified by a data structure attribute of the metadata specifying the viewing region; and determining the type of the viewing region comprises reading the data structure attribute.

In some embodiments, the viewing region type data is specified by an attribute of the metadata specifying the viewing region; and determining the type of the viewing region comprises reading the attribute of the metadata.

In some embodiments, the metadata further comprises second viewing region type data indicating a second type of a second viewing region.

In some embodiments, the first viewing region type data and the second viewing region type is specified by a first data structure attribute of the metadata specifying the viewing region and a second data structure attribute of the metadata specifying the second viewing region; and determining the type of the viewing region comprises reading the first data structure attribute and determining the second type of the second viewing region comprises reading the second data structure attribute.

In some embodiments, the first viewing region type is specified by a data structure attribute of the metadata specifying the viewing region; and the second viewing region type data is specified by an attribute of the metadata specifying a viewing region; and determining the type of the viewing region comprises reading the data structure attribute and determining the second type of the second viewing region comprises reading the attribute of the metadata.

In some embodiments, performing the decoding operation further comprises determining a second type of a second viewing region.

In some embodiments, determining the type of the viewing region comprises determining the viewing region of a recommended type.

In some embodiments, determining the type of the viewing region comprises determining the viewing region of an initial type indicating that the viewport is an initial viewport for playback.

In some embodiments, determining the type of the viewing region comprises determining the viewing region of a popular type.

In some embodiments, determining the type of the viewing region comprises determining the viewing region of a user-selected type indicating that the viewport is selected by a viewer.

Some aspects relate to a method for encoding video data for three-dimensional (3D) immersive media, the method comprising encoding immersive media data, comprising encoding at least a set of one or more tracks, wherein each track of the set comprises associated to-be-decoded immersive media data that corresponds to an associated spatial portion of immersive media content that is different than the associated spatial portions of other tracks in the set of tracks; and metadata specifying a six degree of freedom (6DoF) viewing region in the immersive media content, wherein the metadata comprises first viewing region type data indicating a type of the viewing region, wherein the to-be-decoded immersive media data can be used to perform a decoding operation based on the set of one or more tracks and the viewing region metadata to generate decoded immersive media data for the viewing region.

Some aspects relate to an apparatus configured to decode video data for three-dimensional (3D) immersive media, the apparatus comprising a processor in communication with memory, the processor being configured to execute instructions stored in the memory that cause the processor to perform: accessing immersive media data comprising: a set of one or more tracks, wherein each track of the set comprises associated to-be-decoded immersive media data that corresponds to an associated spatial portion of immersive media content that is different than the associated spatial portions of other tracks in the set of tracks; and metadata specifying a six degree of freedom (6DoF) viewing region in the immersive media content, wherein the metadata comprises first viewing region type data indicating a type of the viewing region; and performing a decoding operation based on the set of one or more tracks and the viewing region metadata to generate decoded immersive media data for the viewing region.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 8A is an exemplary diagram showing a viewport metadata data structure for a 3D position, according to some embodiments.

FIG. 8B is an exemplary diagram showing a viewport metadata data structure for a 3D orientation, according to some embodiments.

FIG. 8C is an exemplary diagram showing a 2D range viewport metadata data structure, according to some embodiments.

FIG. 8D is an exemplary diagram showing a 6DoF viewport metadata data structure, according to some embodiments.

FIG. 9 is a table showing values corresponding to shape types of a 2D or 3D surface region, according to some embodiments.

FIG. 10A shows exemplary syntax that can be used to specify signaling of extrinsic camera information, according to some embodiments.

FIG. 10B shows exemplary syntax that can be used to specify signaling of intrinsic camera information, according to some embodiments.

FIG. 11 is a table showing values that may be used to specify a type of a viewport, according to some embodiments.

FIG. 12A is an exemplary diagram showing a viewport metadata structure for signaling viewports of different types, according to some embodiments.

FIG. 12B is an exemplary diagram showing a viewport metadata structure for signaling viewports of different types, according to some embodiments.

FIG. 13A is an exemplary diagram showing a metadata data structure for a recommended viewport type, according to some embodiments.

FIG. 13B is an exemplary diagram showing a metadata data structure for a recommended viewport type, according to some embodiments.

FIG. 14A is an exemplary diagram showing a metadata data structure having a viewport of a main type and a secondary type, according to some embodiments.

FIG. 14B is an exemplary diagram showing a metadata data structure having a viewport of a main type and a secondary type, according to some embodiments.

FIG. 15A is an exemplary diagram showing a metadata data structure having a viewport of a main type and a secondary type, according to some embodiments.

FIG. 15B is an exemplary diagram showing a metadata data structure having a viewport of a main type and a secondary type, according to some embodiments.

FIG. 16 shows exemplary syntax that can be used to signal static viewports in the sample entry of a media track, according to some embodiments.

FIG. 18 shows an exemplary sample entry syntax that can be used to signal dynamic viewports in timed media tracks, according to some embodiments.

FIG. 20 shows an exemplary sample entry syntax that can be specified using camera parameter based metadata, according to some embodiments.

FIG. 21 shows exemplary sample format syntax that can be specified using camera parameter based metadata, according to some embodiments.

FIG. 22 is a table showing viewport parameters used to signal user-selected viewports, according to some embodiments.

DETAILED DESCRIPTION OF INVENTION

Figure 1:
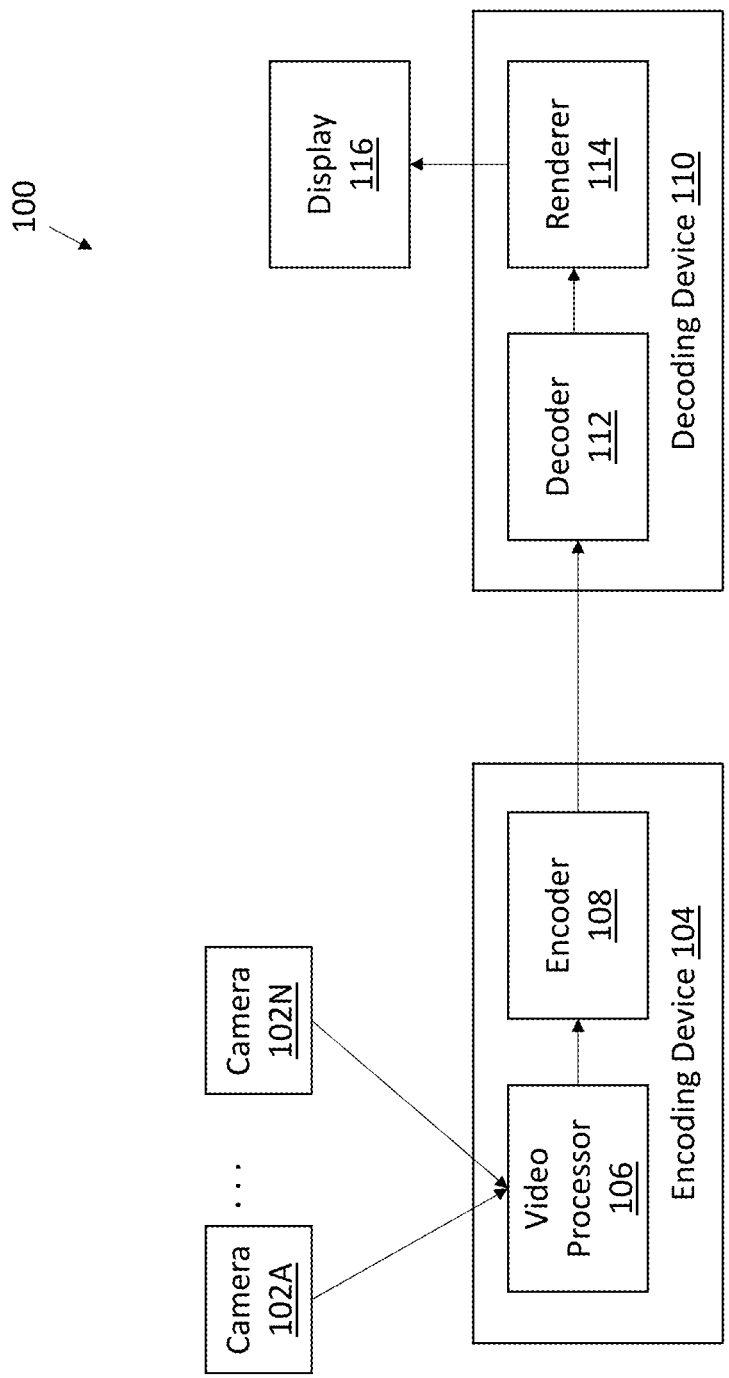
FIG. 1 shows an exemplary video coding configuration, according to some embodiments.

Point cloud data or other immersive media, such as Video-based Point Cloud Compression (V-PCC) data, can provide compressed point cloud data for various types of 3D multimedia applications. In contrast to conventional 2D video content, where the entire video content is typically displayed, only a portion of 3D immersive media content may be viewed on a user device at any particular time. This portion of 3D immersive media content can be specified as a viewing region. For example, a viewing region can be a viewport with six degrees of freedom (6DoF) within the 3D space, such that the viewport represents a projection of texture onto a planar surface of a field of view of an onmidirecitonal or 3D image or video that can be viewed by a user from a particular viewing orientation and viewing position. Conventionally, methods for specifying 6DoF viewing regions for 3D content do not allow for signaling a type of a viewing region. As a result, the inventors have appreciated that conventional techniques do not provide for signaling different types of viewing regions, such as initial viewports, recommended viewports, optional viewports, popular viewports, and/or other types of viewports. It can therefore be desirable to provide techniques that can be used to specify specific types of viewing regions or viewports.

The techniques described herein provide for metadata data structures that can support signaling of various types of viewing regions, including 6DoF viewports in 3D content. Some embodiments provide metadata structures that include a viewport identifier (ID), a viewport type, and/or a viewport description. In some embodiments, consolidated metadata structures can be used to provide a single metadata structure that can be used to specify different types of 6DoF viewports (e.g., leveraging a viewport type field within the structure, which can specify different viewport types). In some embodiments, the techniques include extending conventional metadata structures to include such viewport information in order to add support for viewports of different types. In some embodiments, the techniques provide for metadata structures for specific viewports (e.g., recommended viewports, popular viewports, etc.). Therefore, for example, rather than specifying a type of viewport in a type field, the structure itself can indicate the type of viewport. In some embodiments, the techniques provide for signaling viewports with multiple types (e.g., a main viewport and a secondary viewport). The techniques can also provide for signaling the viewports in different ways, such as in a sample entry and/or a tack group box (e.g., for static viewports that do not change over time), timed metadata tracks (e.g., for dynamic viewports that change over time), using extended metadata structures (e.g., extended sample entry and sample format structures), and/or signaling user-selected viewports in client feedback messages.

As described herein, a feature of 3D immersive media content is that only a portion of the content (not the entirety of the content) is viewed on a user device at any time, which is controlled using a viewport. As a result, signaling of 6DoF viewport types is important in being able to implement a viewer's experience of immersive 3D media content. Without being able to signal different types of 6DoF viewports as described herein, applications of 3D immersive media content are significantly limited in terms of the user's experience, the purpose of a viewport (e.g., in being able to provide certain content of interest for viewing), and/or the like. For example, the techniques can be used to provide an initial recommended viewport that can be changed by the user over time. As an illustrative example, an editor may have a recommended viewport, such as a particular path in a park, a path or floor in a museum, etc. The techniques can provide users with such recommended viewports, and also allow a user to change the viewport during the viewing experience. As a result, the techniques described herein provide for significantly improved user experiences, and also improved flexibility in encoding and decoding 3D immersive media.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
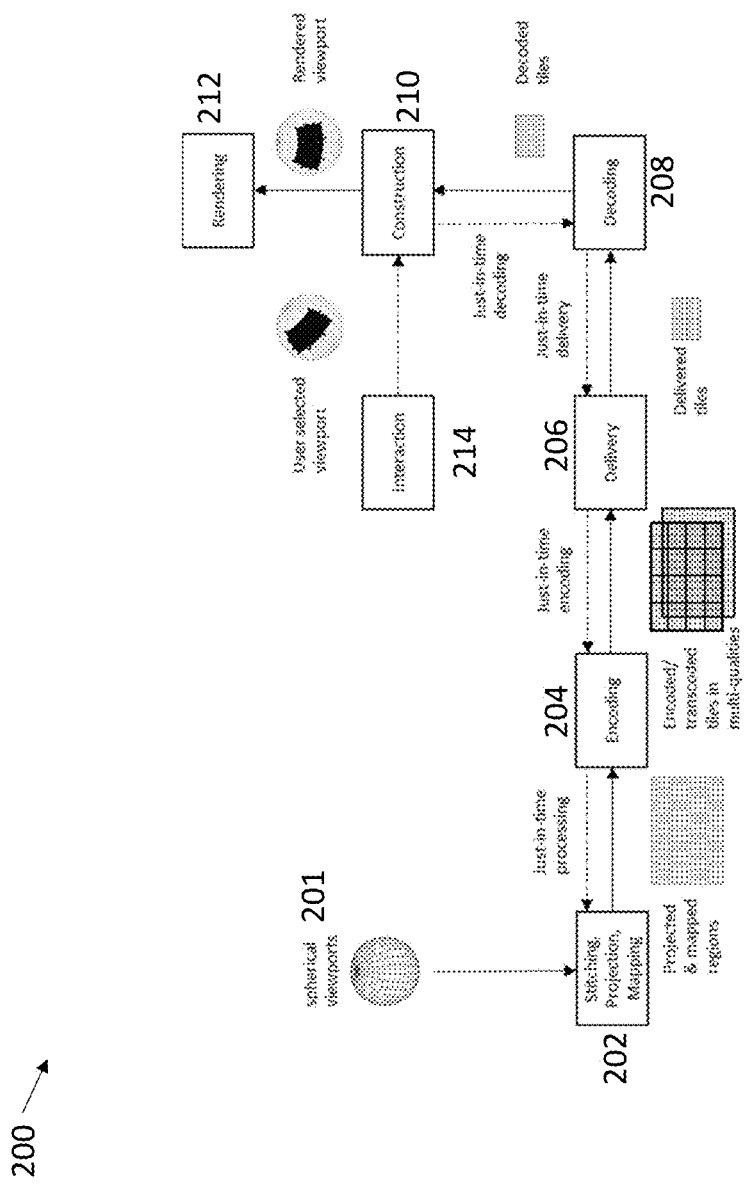
FIG. 2 shows a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

A region of interest (ROI) is somewhat similar in concept to viewport. An ROI may, for example, represent a region in 3D or 2D encodings of omnidirectional video. An ROI can have different shapes (e.g., a square, or a circle), which can be specified in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared. In such implementations, a region of interest typically has a separate video track that carries the ROI content. Thus, the encoded video specifies the ROI, and how the ROI video is associated with the underlying video. The techniques described herein are described in terms of a region, which can include a viewport, a ROI, and/or other areas of interest in video content.

ROI or viewport tracks can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191, also ISO/IEC 23001-10:2015), which is hereby incorporated by reference herein in its entirety, describes an ISO Base Media File Format (ISOBMFF) file format that uses a timed metadata track to signal that a main 2D video track has a 2D ROI track. As another example, Dynamic Adaptive Streaming over HTTP (DASH) includes a spatial relationship descriptor to signal the spatial relationship between a main 2D video representation and its associated 2D ROI video representations. ISO/IEC 23009-1, draft third edition (w10225), Jul. 29, 2016, addresses DASH, and is hereby incorporated by reference herein in its entirety. As a further example, the Omnidirectional MediA Format (OMAF) is specified in ISO/IEC 23090-2, which is hereby incorporated by reference herein in its entirety. OMAF specifies the omnidirectional media format for coding, storage, delivery, and rendering of omnidirectional media. OMAF specifies a coordinate system, such that the user's viewing perspective is from the center of a sphere looking outward towards the inside surface of the sphere. OMAF includes extensions to ISOBMFF for omnidirectional media as well as for timed metadata for sphere regions.

When signaling an ROI, various information may be generated, including information related to characteristics of the ROI (e.g., identification, type (e.g., location, shape, size), purpose, quality, rating, etc.). Information may be generated to associate content with an ROI, including with the visual (3D) spherical content, and/or the projected and mapped (2D) frame of the spherical content. An ROI can be characterized by a number of attributes, such as its identification, location within the content it is associated with, and its shape and size (e.g., in relation to the spherical and/or 3D content). Additional attributes like quality and rate ranking of the region can also be added, as discussed further herein.

Point cloud data can include a set of 3D points in a scene. Each point can be specified based on an (x, y, z) position and color information, such as (R,V,B), (Y,U,V), reflectance, transparency, and/or the like. The point cloud points are typically not ordered, and typically do not include relations with other points (e.g., such that each point is specified without reference to other points). Point cloud data can be useful for many applications, such as 3D immersive media experiences that provide 6DoF. However, point cloud information can consume a significant amount of data, which in turn can consume a significant amount of bandwidth if being transferred between devices over network connections. For example, 800,000 points in a scene can consume 1 Gbps, if uncompressed. Therefore, compression is typically needed in order to make point cloud data useful for network-based applications.

Figure 3:
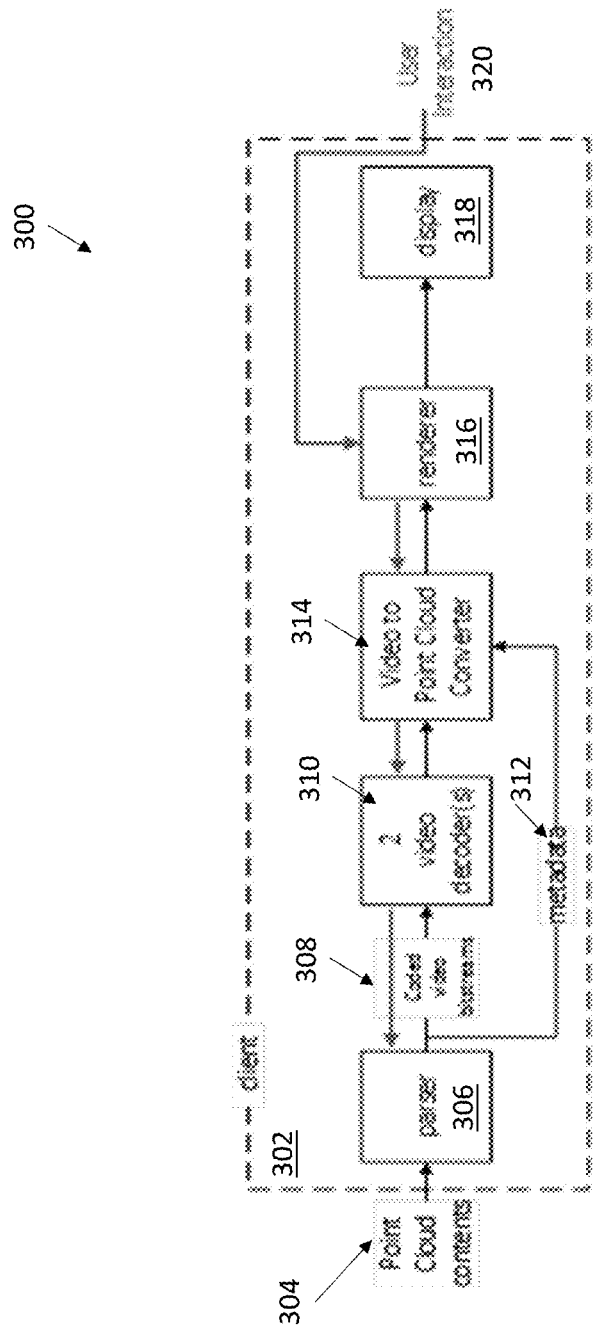
FIG. 3 shows an exemplary processing flow for point cloud content, according to some examples.

MPEG has been working on point cloud compression to reduce the size of point cloud data, which can enable streaming of point cloud data in real-time for consumption on other devices. FIG. 3 shows an exemplary processing flow 300 for point cloud content as a specific instantiation of the general viewport/ROI (e.g., 3DoF/6DoF) processing model, according to some examples. The processing flow 300 is described in further detail in, for example, N17771, "PCC WD V-PCC (Video-based PCC)," July 2018, Ljubljana, SI, which is hereby incorporated by reference herein in its entirety. The client 302 receives the point cloud media content file 304, which is composed of two 2D planar video bit streams and metadata that specifies a 2D planar video to 3D volumetric video conversion. The content 2D planar video to 3D volumetric video conversion metadata can be located either at the file level as timed metadata track(s) or inside the 2D video bitstream as SEI messages.

The parser module 306 reads the point cloud contents 304. The parser module 306 delivers the two 2D video bitstreams 308 to the 2D video decoder 310. The parser module 306 delivers the 2D planar video to 3D volumetric video conversion metadata 312 to the 2D video to 3D point cloud converter module 314. The parser module 306 at the local client can deliver some data that requires remote rendering (e.g., with more computing power, specialized rendering engine, and/or the like) to a remote rendering module (not shown) for partial rendering. The 2D video decoder module 310 decodes the 2D planar video bitstreams 308 to generate 2D pixel data. The 2D video to 3D point cloud converter module 314 converts the 2D pixel data from the 2D video decoder(s) 310 to 3D point cloud data if necessary, using the metadata 312 received from the parser module 306.

The renderer module 316 receives information about users' six-degree viewport information and determines the portion of the point cloud media to be rendered. If a remote renderer is used, the users' 6DoF viewport information can also be delivered to the remote render module. The renderer module 316 generates point cloud media by using 3D data, or a combination of 3D data and 2D pixel data. If there are partially rendered point cloud media data from a remote renderer module, then the renderer 316 can also combine such data with locally rendered point cloud media to generate the final point cloud video for display on the display 318. User interaction information 320, such as a user's location in 3D space or the direction and viewpoint of the user, can be delivered to the modules involved in processing the point cloud media (e.g., the parser 306, the 2D video decoder(s) 310, and/or the video to point cloud converter 314) to dynamically change the portion of the data for adaptive rendering of content according to the user's interaction information 320.

Figure 4:
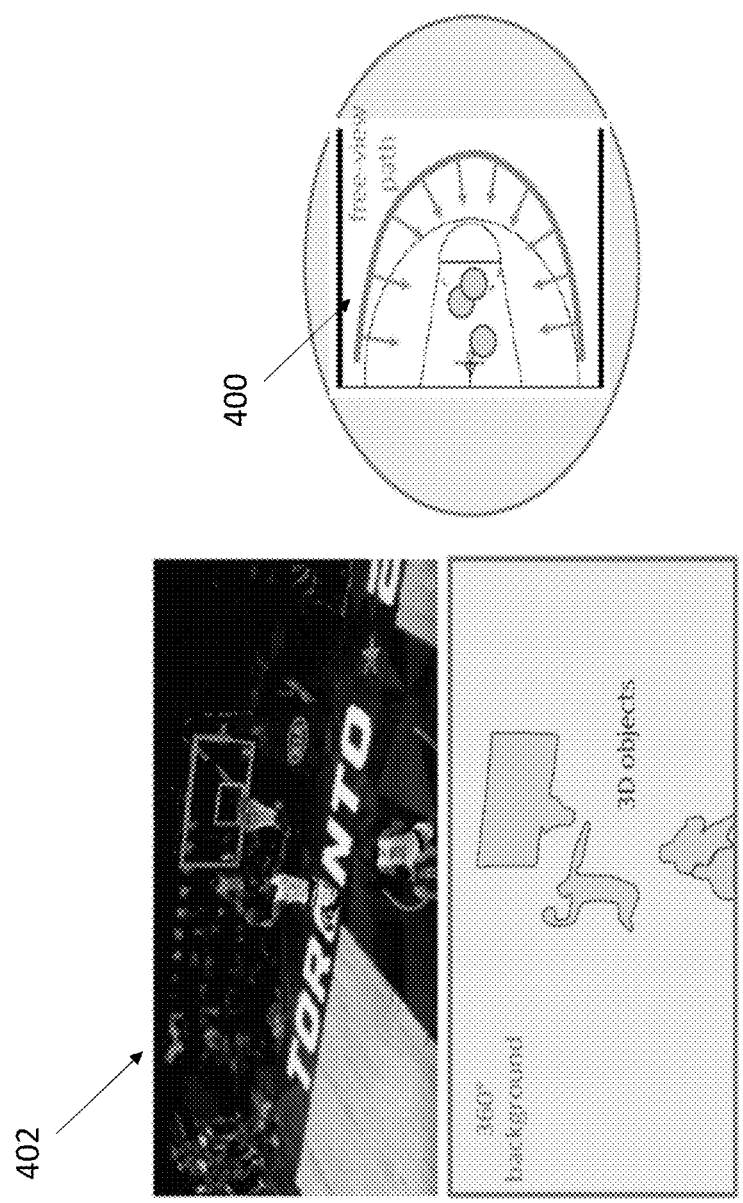
FIG. 4 shows an example of a free-view path, according to some examples.

User interaction information for point cloud media needs to be provided in order to achieve such user interaction-based rendering. In particular, the user interaction information 320 needs to be specified and signaled in order for the client 302 to communicate with the render module 316, including to provide information of user-selected viewports. Point cloud content can be presented to the user via editor cuts, or as recommended or guided views or viewports. FIG. 4 shows an example of a free-view path 400, according to some examples. The free-view path 400 allows the user to move about the path to view the scene 402 from different viewpoints.

Viewports, such as recommended viewports (e.g., Video-based Point Cloud Compression (V-PCC) viewports), can be signaled for point cloud content. A point cloud viewport, such as a PCC (e.g., V-PCC or G-PCC (Geometry based Point Cloud Compression)) viewport, can be a region of point cloud content suitable for display and viewing by a user. Depending on a user's viewing device(s), the viewport can be a 2D viewport or a 3D viewport. For example, a viewport can be a 3D spherical region or a 2D planar region in the 3D space, with six degrees of freedom (6 DoF). The techniques can leverage 6D spherical coordinates (e.g., '6dsc') and/or 6D Cartesian coordinates (e.g., '6dcc') to provide point cloud viewports. Viewport signaling techniques, including leveraging '6dsc' and '6dcc,' are described in co-owned U.S. patent application Ser. No. 16/738,387, titled "Methods and Apparatus for Signaling Viewports and Regions of Interest for Point Cloud Multimedia Data," which is hereby incorporated by reference herein in its entirety. The techniques can include the 6D spherical coordinates and/or 6D Cartesian coordinates as timed metadata, such as timed metadata in ISOBMFF. The techniques can use the 6D spherical coordinates and/or 6D Cartesian coordinates to specify 2D point cloud viewports and 3D point cloud viewports, including for V-PCC content stored in ISOBMFF files. The '6dsc' and '6dcc' can be natural extensions to the 2D Cartesian coordinates '2dcc' for planar regions in the 2D space, as provided for in MPEG-B part 10.

In V-PCC, the geometry and texture information of a video-based point cloud is converted to 2D projected frames and then compressed as a set of different video sequences. The video sequences can be of three types: one representing the occupancy map information, a second representing the geometry information and a third representing the texture information of the point cloud data. A geometry track may contain, for example, one or more geometric aspects of the point cloud data, such as shape information, size information, and/or position information of a point cloud. A texture track may contain, for example, one or more texture aspects of the point cloud data, such as color information (e.g., RGB (Red, Green, Blue) information), opacity information, reflectance information and/or albedo information of a point cloud. These tracks can be used for reconstructing the set of 3D points of the point cloud. Additional metadata needed to interpret the geometry and video sequences, such as auxiliary patch information, can also be generated and compressed separately. While examples provided herein are explained in the context of V-PCC, it should be appreciated that such examples are intended for illustrative purposes, and that the techniques described herein are not limited to V-PCC.

V-PCC has yet to finalize a track structure. An exemplary track structure under consideration in the working draft of V-PCC in ISOBMFF is described in N18059, "WD of Storage of V-PCC in ISOBMFF Files," October 2018, Macau, Conn., which is hereby incorporated by reference herein in its entirety. The track structure can include a track that includes a set of patch streams, where each patch stream is essentially a different view for looking at the 3D content. As an illustrative example, if the 3D point cloud content is thought of as being contained within a 3D cube, then there can be six different patches, with each patch being a view of one side of the 3D cube from the outside of the cube. The track structure also includes a timed metadata track and a set of restricted video scheme tracks for geometry, attribute (e.g., texture), and occupancy map data. The timed metadata track contains V-PCC specified metadata (e.g., parameter sets, auxiliary information, and/or the like). The set of restricted video scheme tracks can include one or more restricted video scheme tracks that contain video-coded elementary streams for geometry data, one or more restricted video scheme tracks that contain video coded elementary streams for texture data, and a restricted video scheme track containing a video-coded elementary stream for occupancy map data. The V-PCC track structure can allow changing and/or selecting different geometry and texture data, together with the timed metadata and the occupancy map data, for variations of viewport content. It can be desirable to include multiple geometry and/or texture tracks for a variety of scenarios. For example, the point cloud may be encoded in both a full quality and one or more reduced qualities, such as for the purpose of adaptive streaming. In such examples, the encoding may result in multiple geometry/texture tracks to capture different samplings of the collection of 3D points of the point cloud. Geometry/texture tracks corresponding to finer samplings can have better qualities than those corresponding to coarser samplings. During a session of streaming the point cloud content, the client can choose to retrieve content among the multiple geometry/texture tracks, in either a static or dynamic manner (e.g., according to client's display device and/or network bandwidth).

A point cloud tile can represent 3D and/or 2D aspects of point cloud data. For example, as described in N18188, entitled "Description of PCC Core Experiment 2.19 on V-PCC tiles, Marrakech, Mass. (January 2019), V-PCC tiles can be used for Video-based PCC. An example of Video-based PCC is described in N18180, entitled "ISO/IEC 23090-5: Study of CD of Video-based Point Cloud Compression (V-PCC)," Marrakech, Mass. (January 2019). Both N18188 and N18180 are hereby incorporated by reference herein in their entirety. A point cloud tile can include bounding regions or boxes to represent the content or portions thereof, including bounding boxes for the 3D content and/or bounding boxes for the 2D content. In some examples, a point cloud tile includes a 3D bounding box, an associated 2D bounding box, and one or more independent coding unit(s) (ICUs) in the 2D bounding box. A 3D bounding box can be, for example, a minimum enclosing box for a given point set in three dimensions. A 3D bounding box can have various 3D shapes, such as the shape of a rectangular parallel-piped that can be represented by two 3-tuples (e.g., the origin and the length of each edge in three dimensions). A 2D bounding box can be, for example, a minimum enclosing box (e.g., in a given video frame) corresponding to the 3D bounding box (e.g., in 3D space). A 2D bounding box can have various 2D shapes, such as the shape of a rectangle that can be represented by two 2-tuples (e.g., the origin and the length of each edge in two dimensions). There can be one or more ICUs (e.g., video tiles) in a 2D bounding box of a video frame. The independent coding units can be encoded and/or decoded without the dependency of neighboring coding units.

Figure 5:
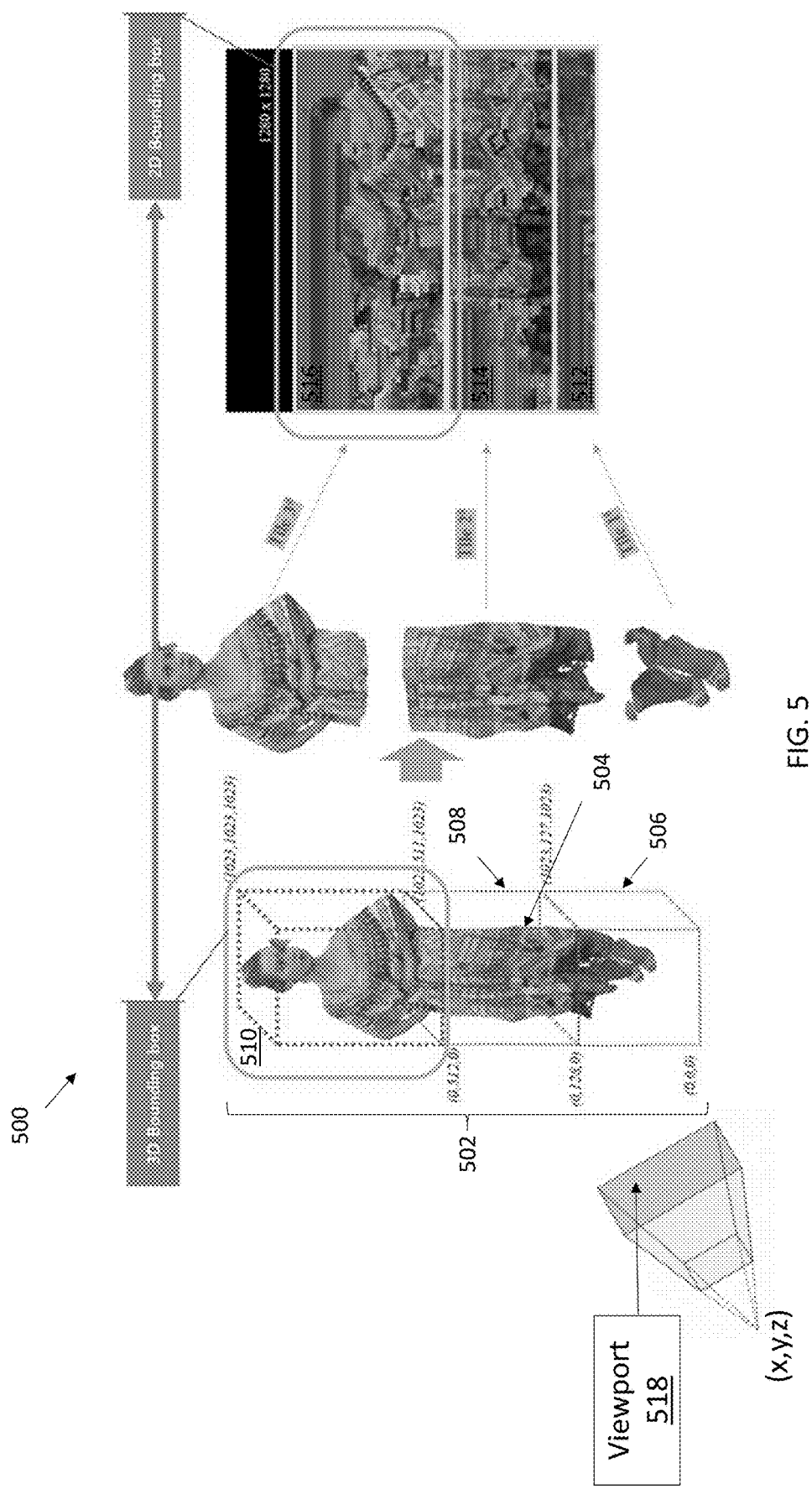
FIG. 5 is a diagram showing exemplary point cloud tiles, including 3D and 2D bounding boxes, according to some examples.

FIG. 5 is a diagram showing exemplary point cloud tiles, including 3D and 2D bounding boxes, according to some examples. Point cloud content typically only includes a single 3D bounding box around the 3D content, shown in FIG. 5 as the large box 502 surrounding the 3D point cloud content 504. As described above, a point cloud tile can include a 3D bounding box, an associated 2D bounding box, and one or more independent coding unit(s) (ICUs) in the 2D bounding box. To support viewport dependent processing, the 3D point cloud content typically needs to be subdivided into smaller pieces or tiles. FIG. 5 shows, for example, the 3D bounding box 502 can be divided into smaller 3D bounding boxes 506, 508 and 510, which each have an associated 2D bounding box 512, 514 and 516, respectively.

A distinct feature of 3D immersive media content is that only a portion, not entirety, of the content a viewport is viewed on a user device at any particular time, which is in contrast to conventional 2D video content where the entire video is typically displayed. The portion of content is usually called a viewport as described in, for example, m52974, entitled "On Metadata for Immersive Media Content for Viewport Dependent Media Processing," Alpbach, Austria (Virtual) (April 2020), m53395, entitled "On Definition of Viewports and their Signaling in ISOBMFF for Viewport Dependent Media Processing," Alpbach, Austria (Virtual) (April 2020), and in M53044, entitled "Signaling of Camera Information in V-PCC Carriage Format," Alpbach, Austria (Virtual) (April 2020), which are hereby incorporated by reference herein in their entirety.

Viewport dependent media processing is to take advantage of this feature in order to improve end-to-end performance of underlying media processing systems or applications, in that only a portion of content covering user's viewport is processed, e.g., delivered and rendered.

A number of viewport specifications were provided in m52974 and m53395, together with corresponding metadata structures to be used for signaling viewports in ISOBMFF of immersive media content such as V-PCC (video-based point cloud compression) and MIV (MPEG Immersive Video). An example of V-PCC is described in N18670, entitled "Text of ISO/IEC DIS 23090-5 Video-based Point Cloud Compression," Gothenburg, Sweden (July 2019), which is hereby incorporated by reference herein in its entirety. An example of MIV is described in N19001, entitled "Working Draft 4 ISO/IEC 23090-12 on Immersive Video," Brussels, Belgium (January 2020). Both N18670 and N19001 are hereby incorporated by reference herein in their entirety. Alternatively or additionally, similar metadata structures may be specified (e.g. as described in M53044) in terms of parameters of a 3D (virtual) camera and/or for signaling viewports in ISOBMFF. The proposed camera parameter syntax and semantics can be compatible with those in V-PCC and MIV specifications (e.g. as described in N18670 and N19001).

Some aspects relate to data structures and fields for extending a specification of a viewport of immersive data. In some embodiments, a viewing orientation may include a triple of azimuth, elevation, and tilt angle characterizing the orientation that a user is consuming the audio-visual content. In the case of image or video, the viewing orientation may include a triple of azimuth, elevation, and tilt angle characterizing the orientation of the viewport. In some embodiments, a viewing position may include a triple of x, y, z characterizing the position in the global reference coordinate system of a user who is consuming the audio-visual content. In the case of image or video, a viewing position may include a triple of x, y, z characterizing the position of the viewport.

According to some embodiments, a viewport may be specified as a projection of texture onto a planar surface, a spherical surface or spatial volume of a field of view of an omnidirectional or 3D image or video suitable for display and viewing by the user with a particular viewing orientation and viewing position (e.g. as described in m52974).

According to some embodiments, a viewport may be specified to be a region of a planar, an omnidirectional or 3D image or video suitable for display and viewing by the user with a particular viewing orientation and viewing position (e.g. as described in m53395).

According to some embodiments, a viewport may be a surficial viewport. In some examples, surficial viewports may include those whose field of view are surficial. For example, the video texture may be projected onto a rectangular planar surface, a circular planar surface, and/or a rectangular spherical surface.

According to some embodiments, a viewport may be a volumetric viewport. In some examples, volumetric viewports may include those whose field of view are volumetric. In some examples, the video texture may be projected onto a rectangular frustum volume (e.g., as a differential, rectangular volume section in the Cartesian coordinates), a circular frustum volume (e.g., as a differential, circular volume section in the Cartesian coordinates), and/or a rectangular frustum volume (e.g., as a differential, rectangular volume section in the spherical coordinates).

Figure 6:
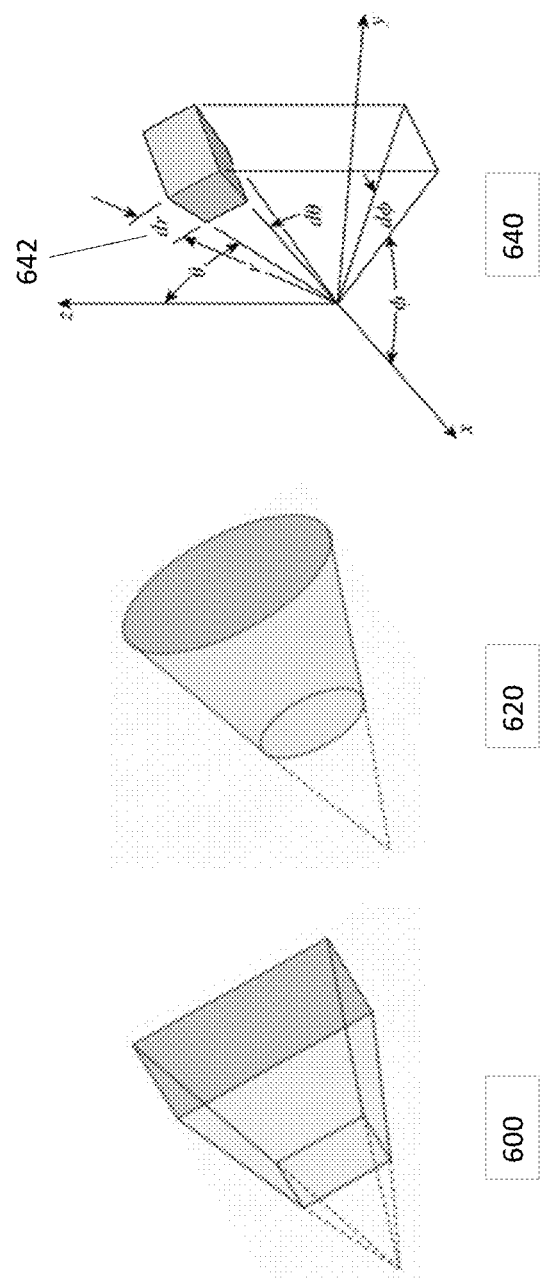
FIG. 6 shows exemplary schematics of volumetric viewports, according to some embodiments.
Figure 7:
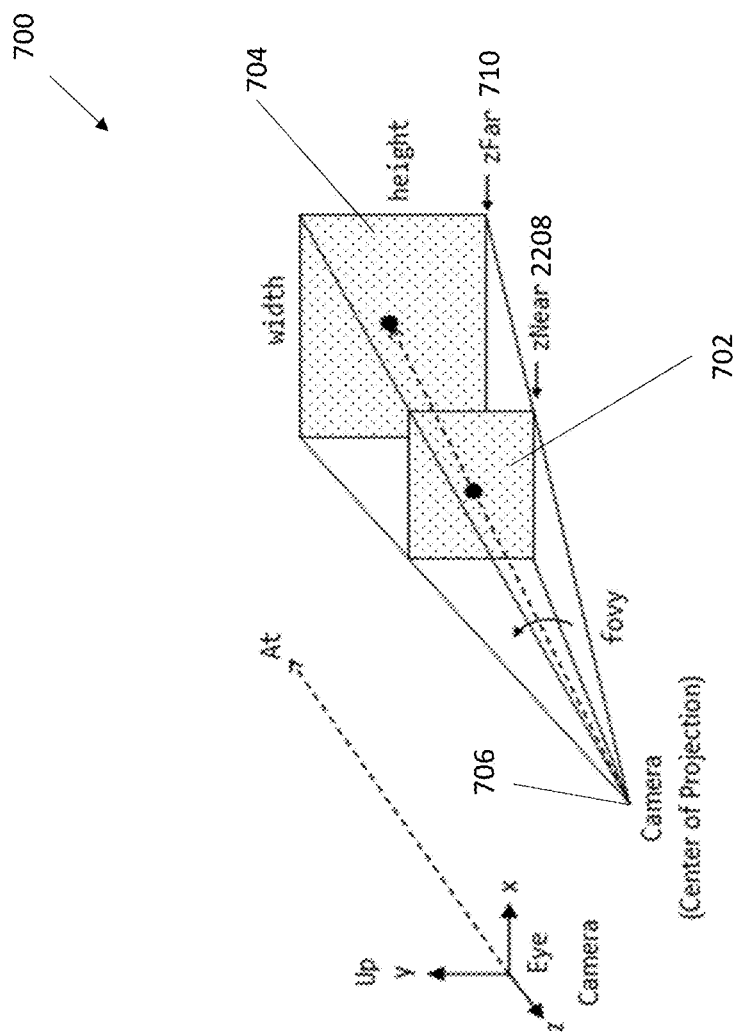
FIG. 7 is an exemplary diagram showing a near view shape and a far view shape, according to some embodiments.

FIG. 6 shows exemplary schematics of volumetric viewports, according to some embodiments. FIG. 6 shows three exemplary volumetric viewports: viewport 600 with a rectangular frustum volume specified in Cartesian coordinates, viewport 620 with a circular frustum volume specified in Cartesian coordinates, and viewport 640 with a rectangular volume specified in spherical coordinates. Such volumetric viewports can be specified as differential volume expansions (e.g., of a planar surface) along the viewing orientation with some viewing depth, such as dr 642 for viewport 640. According to some embodiments, volumetric viewports are the differential volume expansions of their planar counterparts along the viewing orientation with some viewing depth (e.g., dr in 640). As described herein, volumetric viewports can be differential volumetric expansions along the viewing orientation with a viewing depth. In some embodiments, a volumetric viewport can include a far-side view sharp range specification. In some embodiments, a viewing depth can be signaled. For example, a distance r (such as the distance r discussed in conjunction with dr 642 in FIG. 6) can be signaled. As another example, a ratio between ranges of near and far view shapes can be signaled. FIG. 7 is an exemplary diagram 700 showing a near view shape 702 and a far view shape 704, according to some embodiments. The user/viewer eye (or camera) is at location 706, and therefore the distance to the near-side shape 702 and far-side view shape 704 can be signaled based on location 706 using zNear 708 for the near-side shape 702 and zFar 710 for the far-side shape 704. The ratio between the corresponding ranges of the near-side and far-side view shapes 702 and 704 can also be signaled (e.g., as zFar 710/zNear 708). In some embodiments, widthNear/zNear=widthFar/zFar→widthNear/widthFar=zNear/zFar, and heightNear/zNear=heightFar/zFar→heightNear/heightFar=zNear/zFar. Thus, in some embodiments, widthNear/widthFar=heightNear/heightFar=zNear/zFar.

FIGS. 8A-D are exemplary diagrams showing metadata data structures for viewports, according to some embodiments. In order to support volumetric viewports in addition to surficial viewports, the surficial viewport metadata structures can be extended with fields 'volumetric_flag' and 'viewing_depth'.

FIG. 8A shows exemplary metadata data structure 810. The centre_x field 811, centre_y field 812 and centre_z field 813 of exemplary 3D position metadata data structure 810 in FIG. 8 may specify the x, y and z axis values, respectively, of the centre of the sphere region, for example, with respect to the origin of the underlying coordinate system.

FIG. 8B shows exemplary metadata data structure 820. The centre_azimuth field 821 and centre elevation field 822 specify the azimuth and elevation values, respectively, of the centre of the sphere region in units of $2^{-16}$ degrees. In some examples, the centre_azimuth field 821 shall be in the range of $-180*2^{16}$ to $180*2^{16}-1$, inclusive. In some examples, the centre elevation field 822 shall be in the range of $-90*2^{16}$ to $90*2^{16}$, inclusive. The centre_tilt field 823 specifies the tilt angle of the sphere region in units of $2^{-16}$ degrees. In some examples, the centre_tilt field 823 is constrained to be in the range of $-180*2^{16}$ to $180*2^{16}-1$, inclusive.

FIG. 8C shows exemplary metadata data structure 830. A shape_type field may specify a shape type of a 2D or 3D surface region, according to the table in FIG. 9. In some examples, a shape_type value of 0 may indicate a shape of a 2D rectangle. In some examples, a shape_type value of 1 may indicate a shape of a 2D circle. In some examples, a shape_type value of 2 may indicate a shape of a 3D sphere region. In some examples, other shape_type values may be reserved for other shapes.

If a shape_type value indicates a shape of a 2D rectangle (e.g. as in 831), the shape may be specified by a range_width field 832 and range_height field 833. The range_width field 832 and range_height field 833 may specify the width and height ranges, respectively, of a 2D or 3D rectangular region. They specify the ranges through a reference point of the rectangular region, which could be either the top left point or centre point, inferred as specified in the semantics of the structure containing the instances of these metadata. If a shape_type value indicates a shape of a 2D circle (e.g. as in 834), the shape may be specified by a range_radius field 835. The range_radius field 835 may specify the radius range of a circular region. If a shape_type value indicates a shape of a 3D spherical region (e.g. as in 836), the shape may be specified by a range_azimuth field 837 and range_elevation field 838. In some examples, the range_azimuth 837 may be in the range of 0 to $360*2^{16}$, inclusive. In some examples, the range_elevation 838 may be in the range of 0 to $180*2^{16}$, inclusive.

FIG. 8D shows an exemplary viewport structure 840, according to some embodiments. The viewport with 6DoF structure 840 takes as input the following flags: position_included_flag 841, orientation_included_flag 842, range_included_flag 843, shape_type 844, volumetric_flag 845, and interpolate_included_flag 846.

According to some embodiments, when any of the position, orientation, range, shape and interoperate metadata are not present in an instance of 6DoF viewport metadta data structures, they are inferred as specified in the semantics of the structure containing the instance. If position_included_flag 841 is true, the structure 840 includes 3DPositionStruct 848 (e.g. as in 847). If orientation_included_flag 842 is true, the structure 841 includes 3DOrientationStruct 850 (e.g. as in 849). If range_included_flag 843 is true, the structure 841 includes a 2DRangeStruct 852 that takes in a shape_type 844 (e.g. as in 851). If volumetric_flag 845 is true, the structure 841 includes an integer field viewing_depth 854 (e.g. as in 853). In some examples, the semantics of interpolate are specified by the semantics of the structure containing this instance of it. If the interpolate_included_flag 846 is true, the structure 841 includes a interpolate field 856 and a reserved field 857 (e.g. as in 855).

Some aspects may relate to metadata for camera information. For example, metadata for camera information in V-PCC carriage format (e.g. as described in M53044) is described herein. FIG. 10A-B shows exemplary syntax that can be used to specify signaling of extrinsic and intrinsic camera information, according to some embodiments. In some embodiments, syntax may be used to specify signaling of intrinsic and extrinsic camera information in V-PCC carriage format. Using this information, the receiver may render the V-PCC content based on the signaled real or virtual camera positions and orientations.

FIG. 10A shows exemplary syntax 1010 that can be used to specify signaling of extrinsic camera information, according to some embodiments. The camera_id field 1011 contains an identifying number that is used to identify a given (real or virtual) camera.

The camera_pos_present field 1012 may have different values. For example, a value equal to 1 may indicate that the camera position parameters are present. The camera_pos_present field 1012 equal to 0 may indicates that the camera position parameters are not present. If the field's value is 1, camera_pos_x field 1015, camera_pos_y field 1016 and camera_pos_z field 1017 respectively indicate the x, y and z coordinates of the location of the camera in meters in the global reference coordinate system. The values shall be in units of $2^{-16}$ meters.

The camera_ori_present field 1013 may have different values. A value equal to 1 may indicate that the camera orientation parameters are present. The camera_ori_present field 1013 is equal to 0, this may indicate that the camera orientation parameters are not present. If the field's value is 1, camera_quat_x field 1019, camera_quat_y field 1020 and camera_quat_z field 1021 indicate the x, y, and z components, respectively, of the orientation of the camera using the quaternion representation. The values may be a floating-point value in the range of −1 to 1, inclusive. These values may specify the x, y and z components, namely qX, qY and qZ, for the rotations that are applied to convert the global coordinate axes to the local coordinate axes of the camera using the quaternion representation. The fourth component of the quaternion qW is calculated as follows:

$$qW=\text{sqrt}(1-(qX^2+qY^2+qZ^2))$$

The point (w, x, y, z) can represent a rotation around the axis directed by the vector (x, y, z) by an angle $2*\cos^{-1}(w)=2*\sin^{-1}(\text{sqrt}(x^{2}+y^{2}+z^{2}))$.

FIG. 10B shows exemplary syntax 1030 that can be used to specify signaling of intrinsic camera information, according to some embodiments. The camera_id field 1031 contains an identifying number that is used to identify a given (real or virtual) camera. The camera_type field 1032 indicates the projection method of the camera. For example, a camera_type equal 0 specifies ERP projection and a camera_type equal to 1 may specify a perspective projection. In some examples, a camera_type equal to 2 specifies an orthographic projection and camera_type values in range 3 to 255 are reserved for future use by ISO/IEC.

The camera_proj_params_present field 1033 equal to 1 indicates that the camera projection parameters are present. The camera_proj_params_present field 1033 equal to 0 indicates that the camera projection parameters are not present. The camera_depth_present field 1034 may indicate whether camera depth parameters are or are not present. For example, a camera_depth_present field 1034 value equal to 1 indicates that the camera depth parameters are present. For example a camera_depth_present field 1034 value equal to 0 may indicate that the camera depth parameters are not present. According to some embodiments, if the camera_type field value equals 0 and camera_proj_params_present value equals 1, the structure may further include erp_horizontal_fov field 1036 and erp_vertical_fov field 1037. Field erp_horizontal_fov 1036 may specify the longitude range for an ERP projection corresponding to the horizontal size of the viewing frustum associated with the camera, in units of radians. For example, the value may be in the range 0 to 2π. Field erp_vertical_fov 1037 may specify the latitude range for an ERP projection corresponding to the vertical size of the viewing frustum associated with the camera, in units of radians. For example, the value may be in the range 0 to π.

According to some embodiments, if the camera_type field value equals 1 and camera_proj_params_present value equals 1, the structure may further include perspective_horizontal_fov field 1039 and perspective_verical_fov field 1040. Field perspective_horizontal_fov 1039 may specify the horizontal field of view for perspective projection in radians. For example, the value may be in the range of 0 and 71 Field perspective_vertical_fov 1040 may specify the vertical field of view for perspective projection in radians. For example, the value may be in the range of 0 and 71 Alternatively or additionally, a perspective_aspect_ratio field may specify the relative aspect ratio of the viewing frustum associated with the camera for perspective projection (horizontal/vertical).

According to some embodiments, if the camera_type field value equals 2 and camera_proj_params_present value equals 1, the structure may further include ortho_aspect_ratio field 1042 and ortho_horizontal_size field 1043. The ortho_aspect_ratio field 1042 may specify the relative aspect ratio of the viewing frustum associated with the camera for orthogonal projection (horizontal/vertical). The ortho_horizontal_size may specify in meters the horizontal size of the orthogonal part of the viewing frustum associated with the camera.

According to some embodiments, if the camera_depth_present field value equals 1, the structure may further include ortho_aspect_ratio field 1045 and ortho_horizontal_size field 1046. The camera_near_depth field 1045 and camera_far_depth field 1046 may indicate the near and far depths (or distances) based on the near and far planes of the viewing frustum associated with the camera. These values may be in units of $2^{-16}$ meters.

The techniques described herein provide for signaling various types of viewports based on metadata structures. For example, some metadata structures are described in m52974, m53395, and M53044. The types of viewports may include those such as recommended, initial, popular, and user-selected viewports, when immersive media content is carried in ISOBMFF (e.g., as provided in N19066, entitled "Draft text of ISO/IEC DIS 23090-10 Carriage of Video-based Point Cloud Compression Data," Brussels, Belgium (January 2020), which is hereby incorporated by reference herein in its entirety).

The camera parameter metadata structures may align well with MIV (e.g. as described in N19001). However, the inventors have appreciated that being able to signal different viewport types can be particularly important when the camera parameter metadata structures present gaps between (a) signaling camera parameters and (b) signaling various viewports of various types (e.g., even for viewports that may have similar attributes and building blocks with different, but one-to-one corresponding, attribute names).

In general, the inventors have appreciated that signaling of viewport types can be important to implement a viewer's experience of immersive media content. Without being able to support robust viewport type signaling, it can be difficult to indicate, for example, how a viewport comes into play into the experience, a purpose of a viewport, and/or the like. According to some embodiments, for example, a recommended viewport may be a viewport suggested as an editor's cut by a content provider or editor. This type of viewport can be static or dynamically changing over time. Recommended viewports may be useful for storytelling, for example, without requiring any user interaction with the immersive media content. In some examples, if a recommended viewport is also popular, it may be more efficient to encode a viewport as an independent bitstream and carried in its own track or tracks.

According to some embodiments, an initial viewport may be a viewport initially set for viewers when they start to playback the immersive media content to guide the viewers as to where to initially playback the immersive media content. In some examples, an initial viewport is most likely static, until it is changed by a user's interaction. In some examples, a viewport of this type can be a recommended viewport. An initial viewport can be used to indicate an initial orientation, an initial position, etc., of a viewport when other attributes of a viewport are omitted or not present.

According to some embodiments, a popular viewport may be a viewport based on its viewing popularity, or recommended by viewers, rather than by a content editor. For example, a popular viewport may be selected based on measurements of viewing statistics.

According to some embodiments, a user-selected viewport may be a viewport selected by a viewer when the viewer interacts with the immersive media content. For example, a user-selected viewport may be based on the selected viewport of another user.

It is therefore desirable to be able to signal such various types of viewports, including recommended viewports, initial viewports, popular viewports, user-selected viewports, and/or other viewports. The techniques described herein provide for various metadata structures that can be used to signal different viewport types and associated information. As described herein, some embodiments provide metadata structures that include a viewport identifier (ID), a viewport type, and/or a viewport description. For example, a 6DoF viewport can be specified using a metadata structure that includes a type field that can provide a type of the viewport (e.g., which can result in a much more condensed metadata structure, compared to using separate metadata specifications for different viewport types. In some embodiments, consolidated metadata structures can be used to provide a single metadata structure that can be used to specify different types of 6DoF viewports. In some embodiments, the techniques include extending conventional metadata structures to include enhanced viewport information, such as a viewport type. In some embodiments, the techniques provide for metadata structures for specific viewports (e.g., recommended viewports, popular viewports, etc.). In some embodiments, the techniques provide for signaling viewports with multiple types (e.g., a main viewport and a secondary viewport).

According to some embodiments, depending on aspects of the viewport, such as whether a viewport is static, dynamic or user selected, a viewport can be signaled in different ways. For example, when a viewport is static, the metadata can be signaled in media tracks. For example, the metadata data can be signed within the sample entry of each and every media track that provides media content for the viewport. As another example, the metadata can be signaled at the file format track grouping level. At this level, media tracks can be grouped together by having each track to include one or more track grouping boxes with a same identifier that contain one or more viewport metadata data structures that the media tracks collectively carry the media content covering the viewport e.g., as provided in m50606, entitled "Evaluation Results for CE on Partial Access of Point Cloud Data," Geneva, Switzerland (October 2019), which is hereby incorporated by reference herein in its entirety.

As described herein, depending on whether a viewport is static, dynamic or user selected, a viewport can be signaled in different ways. In the case that a viewport is dynamic, the metadata can be signaled in the sample entry and samples of a timed metadata track. At the timed metadata track level, a timed metadata track for specifying a viewport can reference the one or more tracks that collectively carry the media content covering the viewport, e.g., as provided in m52494, entitled "On Surficial and Volumetric Viewports for Immersive Media," Brussels, Belgium (January 2020), which is hereby incorporated by reference herein in its entirety.

According to some embodiments, if the viewport is user selected, the metadata can be signaled in a client feedback message, such as a SAND message (e.g., as provided in m50655, entitled "Dynamic Signaling of User-Selected and Recommended Viewports for PC Data," Geneva, Switzerland (October 2019), which is hereby incorporated by reference herein in its entirety).

Some aspects relate to methods for specifying viewports of different types by using new metadata structures and fields. In some embodiments, the techniques can be used to extend metadata data structures (e.g. such as those in m52974, m53395, M53044). In some embodiments, the metadata data structure may be extended by adding attributes. For example, the new attributes may include a viewport ID (e.g., viewport_id), a viewport type (e.g., viewport_type), and/or a viewport description (e.g., viewport_description).

The viewport_id may specify a viewport identifier that identifies the viewport. The viewport_id may be an unsigned int(32). The viewport_type field may specify the type of the viewport as listed in the table of FIG. 11. The viewport_type may indicate one or more types, such as a main viewport type and optionally a secondary viewport type. A main and secondary viewport type can be used in order to support, for example, a viewport being "recommended" as the main type and "initial" as the secondary type, or being "popular" as the main type and "user-selected" as the secondary type. A viewport need not always include main and secondary types. For example, a viewport can be of only one of a main type or a secondary type (e.g., a main type without any secondary type), and not all the combinations of main types and secondary types of viewports may make sense in practice. A viewport_type may be an unsigned int(8). The viewport_description may be a null-terminated UTF-8 string that provides a textual description of the viewport.

As described herein, FIG. 11 is a table of exemplary values of a viewport_type, each indicating a type of viewport. For example, a viewport_type value of 0 may indicate an unspecified (main) viewport, for use by applications. A viewport_type value of 1 may indicate a recommended (main) viewport, which may be a viewport selected per the director's cut or recommendation (i.e., according to the creative intent of the content author or content provider). A viewport_type value of 2 may indicate an initial (main) viewport, which may be a viewport selected for initial playback of the immersive content when no other viewport is selected. A viewport_type value of 3 may indicate a popular (main) viewport, which may be a viewport selected based on its viewing popularity, or recommended by viewers, rather than by a content editor. A viewport_type value of 4 may indicate a user-selected (main) viewport, which may be a viewport selected by a viewer when the viewer interacts with the immersive media content. A viewport_type value of between 5 and 239 may be reserved for future main viewport types. A viewport_type value of 240 may indicate an unspecified (secondary) viewport. A viewport_type value of 241 may indicate a recommended (secondary) viewport. A viewport_type value of 242 may indicate an initial (secondary) viewport. A viewport_type value of 243 may indicate a popular (secondary) viewport. A viewport_type value of 244 may indicate a user-selected (secondary) viewport. A viewport_type value of between 245 and 255 may be reserved for future secondary viewport types. In some embodiments, given the number of bits available for the viewport_type, the type could be split into multiple parts, as desired.

Additionally or alternatively, in some embodiments, a viewport of a particular type can be individually specified for each and every viewport type or viewport combination of a main type and a secondary type. Such an approach can result in the individual metadata data structures of viewport of different types as described herein may be different from the consolidated metadata data structures of different types as described herein.

Some embodiments of the techniques described herein provide consolidated metadata data structures of viewports of different types. According to some embodiments, metadata data structures for viewports of different types (e.g. TypedViewportWith6DoFStruct( )) can be specified, as described further herein, depending on which viewport metadata is to be extended (e.g., metadata described in m52974, m53395, M53044). In some embodiments, the techniques can include adding one or more of a viewport ID, a viewport type, and/or a viewport description to extend syntax specifications.

For example, an extended metadata data structure can be seen in FIG. 12A. FIG. 12A shows an exemplary typed viewport structure 1210, according to some embodiments. The typed viewport with 6DoF structure 1210 takes as input the following flags: position_included_flag 1211, orientation_included_flag 1212, range_included_flag 1213, shape_type 1214, volumetric_flag 1215, and interpolate_included_flag 1216. Additionally, as described herein, the additional attributes viewport_id 1217, viewport_type 1218, and viewport_description 1219 are included. Additionally, the typed viewport of FIG. 12A includes a viewport with 6DoF structure 1220. The viewport with 6DoF structure 1220 takes as input the following flags: position_included_flag 1221, orientation_included_flag 1222, range_included_flag 1223, shape_type 1224, volumetric_flag 1225, and interpolate_included_flag 1226.

Another extended metadata data structure 1230 can be seen in FIG. 12B. FIG. 12A shows a syntax that is camera independent, while FIG. 12B shows a syntax that is camera-based. FIG. 12B shows an exemplary typed viewport structure 1230, according to some embodiments. The typed viewport with 6DoF structure 1230 includes viewport_id 1231, viewport_type 1232, viewport_description 1233, ExtCameraInfoStruct( ) 1234, and IntCameraInfoStruct( ) 1235.

As described herein, the viewport_id 1231 may specify a viewport identifier that identifies the viewport. The viewport_id 1231 may be an unsigned integer (e.g., int(32)). The viewport_type 1232 field may specify the type of the viewport as listed in the table of FIG. 11. The viewport_type 1232 may indicate a main viewport type and optionally a secondary viewport type, in order to support, for example, a viewport being "recommended" as the main type and "initial" as the secondary type, or being "popular" as the main type and "user-selected" as the secondary type. A viewport can be of only a main type without any secondary type, and it is not all the combinations of main types and secondary types that make sense in practice. A viewport_type 1232 may be an unsigned int(8). The viewport_description 1233 may be a null-terminated UTF-8 string that provides a textual description of the viewport.

As described herein, ExtCameraInfoStruct( ) 1234 and IntCameraInfoStruct( ) 1235 specify signaling of extrinsic and intrinsic camera information, respectively, in V-PCC carriage format. Using this information, the receiver may render the V-PCC content based on the signaled real or virtual camera positions and orientations. Exemplary syntax for ExtCameraInfoStruct( ) 1234 and IntCameraInfoStruct ( ) 1235 are described in relation with FIGS. 10A and 10B.

The consolidated metadata data structures (e.g., such as those described in conjunction with FIGS. 12A-12B) leverage a common metadata structure and indicate the viewport_type within the data structure. Therefore, such structures require looking into the data structure for the viewport_type attribute to determine the type of viewport. It may be desirable, in some scenarios, to be able to determine aspects of the viewport prior to and/or without needing to parse or process the data structure. According to some embodiments, individual metadata data structures can be specified for each viewport type. As a result, viewport information (e.g., a type of viewport) can be determined based on the metadata structure itself (e.g., rather than needing to parse through the contents of the structure, as with consolidated metadata structures).

According to some embodiments, a metadata data structure for a recommended viewport, or a viewport of the "recommended" type, can be specified as seen in FIGS. 13A and 13B. This can be achieved, for example, by hard-coding the type into a data structure attribute (e.g., as part of the data structure name, data structure type, etc.) without the attribute viewport_type.

FIG. 13A shows an exemplary metadata data structure for a recommended viewport 1310, according to some embodiments. Structure 1310 takes as input the following flags: position_included_flag 1311, orientation_included_flag 1312, range_included_flag 1313, shape_type 1314, volumetric_flag 1315, and interpolate_included_flag 1316. Additionally, as described herein, attributes viewport_id 1317 and viewport_description 1318 are included. Additionally, the structure of FIG. 13A includes a viewport with 6DoF structure 1319. The viewport with 6DoF structure 1319 takes as input the following flags: position_included_flag 1320, orientation_included_flag 1321, range_included_flag 1322, shape_type 1323, volumetric_flag 1324, and interpolate_included_flag 1325. Unlike the structure 1210 of FIG. 12A, no viewport_type parameter is needed, as the structure is specified to be for the "recommended" viewport type.

FIG. 13B shows another metadata data structure for a recommended viewport, or a viewport of the "recommended" type. The structure 1330 includes viewport_id 1331, viewport_description 1332, ExtCameraInfoStruct( ) 1333, and IntCameraInfoStruct( ) 1334.

As described herein, the viewport_id 1331 may specify a viewport identifier that identifies the viewport. The viewport_id 1331 may be an unsigned int(32). The viewport_description 1332 may be a null-terminated UTF-8 string that provides a textual description of the viewport.

As described herein, ExtCameraInfoStruct( ) 1333 and IntCameraInfoStruct( ) 1334 specify signaling of extrinsic and intrinsic camera information, respectively, in V-PCC carriage format. Using this information, the receiver may render the V-PCC content based on the signaled real or virtual camera positions and orientations. Exemplary syntaxes for ExtCameraInfoStruct( ) 1333 and IntCameraInfoStruct( ) 1334 are described in relation with FIGS. 10A and 10B.

According to some embodiments, a viewport may be of multiple types, such as a main type and a secondary type. This can be achieved, for example, by indicating a second type (e.g., secondary type) using a viewport_type field within a metadata data structure specified for first type (e.g., a main viewport type). For example, FIG. 14A-B shows exemplary metadata data structures 1410 and 1430, representing a viewport of an initial recommended viewport, or a viewport of the "recommended" main type and "initial" secondary type.

FIG. 14A shows an exemplary typed viewport structure 1410, according to some embodiments. The structure 1410 is specified as "RecommededViewportWith6DoFStruct( )" which indicates the main viewport type as "recommended". The structure 1410 takes as input the following flags: position_included_flag 1411, orientation_included_flag 1412, range_included_flag 1413, shape_type 1414, volumetric_flag 1415, and interpolate_included_flag 1416. Additionally, as described herein, attributes viewport_id 1417, viewport_type 1418, and viewport description 1419 are included. In this case, the viewport_type indicates the secondary type of the viewport.

Additionally, the typed viewport of FIG. 14A includes a viewport with 6DoF structure 1420. The viewport with 6DoF structure 1420 takes as input the following flags: position_included_flag 1421, orientation_included_flag 1422, range_included_flag 1423, shape_type 1424, volumetric_flag 1425, and interpolate_included_flag 1426.

Another metadata data structure 1430 can be seen in FIG. 14B. FIG. 14B shows an exemplary typed viewport structure 1430, according to some embodiments. The structure 1430 is specified as "RecommededViewportWith6DoFStruct( )" which indicates the main viewport type as "recommended". The typed viewport with 6DoF structure 1430 includes viewport_id 1431, viewport_type 1432, viewport_description 1433, ExtCameraInfoStruct( ) 1434, and IntCameraInfoStruct( ) 1435. In this case, the viewport_type 1432 indicates the secondary viewport type.

As described herein, the viewport_id 1431 may specify a viewport identifier that identifies the viewport. The viewport_id 1431 may be an unsigned int(32). The viewport_type 1432 field may specify the type of the viewport as listed in the table of FIG. 11. A viewport_type 1432 may be an unsigned int(8). The viewport_description 1433 may be a null-terminated UTF-8 string that provides a textual description of the viewport.

As described herein, ExtCameraInfoStruct( ) 1434 and IntCameraInfoStruct( ) 1435 specify signaling of extrinsic and intrinsic camera information, respectively, in V-PCC carriage format. Using this information, the receiver may render the V-PCC content based on the signaled real or virtual camera positions and orientations. Exemplary syntax for ExtCameraInfoStruct( ) 1434 and IntCameraInfoStruct ( ) 1435 are described in relation with FIGS. 10A and 10B. Another way of indicating a main type and a secondary type of a viewport may be to specify data structures for a viewport with specific main and secondary type, for example, by hard-coding the types into data structure attributes (e.g., into the data structure names, data structure types, data structure fields, etc.). FIGS. 15A and 15B show metadata data structures for an initial recommended viewport, or a viewport of the "recommended" main type and "initial" secondary type specified by hard-coding the types into a data structure attribute (e.g., data structure name, in this example) without using viewport_type.

FIG. 15A shows an exemplary metadata data structure for a recommended viewport 1510, according to some embodiments. The structure 1510 is specified as "InitialRecommendedViewportWith6DoFStruct" which indicates the main viewport type as "recommended" and the secondary viewport type as "initial". Structure 1510 takes as input the following flags: position_included_flag 1511, orientation_included_flag 1512, range_included_flag 1513, shape_type 1514, volumetric_flag 1515, and interpolate_included_flag 1516. Additionally, as described herein, attributes viewport_id 1517 and viewport_description 1518 are included. Additionally, the structure of FIG. 15A includes a viewport with 6DoF structure 1519. The viewport with 6DoF structure 1519 takes as input the following flags: position_included_flag 1520, orientation_included_flag 1521, range_included_flag 1522, shape_type 1523, volumetric_flag 1524, and interpolate_included_flag 1525. Unlike the structure 1410 of FIG. 14A, no viewport_type parameter is needed, as the structure is specified to be for the "recommended" viewport type.

FIG. 15B shows another metadata data structure. The structure 1510 is specified as "InitialRecommededViewportWith6DoFStruct" which indicates the main viewport type as "recommended" and the secondary viewport type as "initial". The structure 1530 includes viewport_id 1531, viewport_description 1532, ExtCameraInfoStruct( ) 1533, and IntCameraInfoStruct( ) 1534.

As described herein, the viewport_id 1531 may specify a viewport identifier that identifies the viewport. The viewport_id 1531 may be an unsigned int(32). The viewport_description 1532 may be a null-terminated UTF-8 string that provides a textual description of the viewport.

As described herein, ExtCameraInfoStruct( ) 1533 and IntCameraInfoStruct( ) 1534 specify signaling of extrinsic and intrinsic camera information, respectively, in V-PCC carriage format. Using this information, the receiver may render the V-PCC content based on the signaled real or virtual camera positions and orientations. Exemplary syntax for ExtCameraInfoStruct( ) 1533 and IntCameraInfoStruct ( ) 1534 are described in relation with FIGS. 10A and 10B.

The techniques described herein can be used to signal different types of viewports in different ways. Some embodiments relate to signaling static viewports of different types in media tracks. According to some embodiments, static viewports can be signaled in the sample entry of a media track, such as a VPCC track. For example, FIG. 16 shows exemplary syntax 1600 used to signal static viewports in the sample entry of a media track, according to some embodiments. As a result, the viewport can remain constant across all samples of a track. The num_viewports field 1610 may indicate the number of viewports in the point cloud. For each of the viewports (e.g., 1620), a typed viewport structure 1630 is called. The typed viewport structure 1630 may have a structure such as those specified in relation with FIGS. 12A and 12B.

Figure 17:
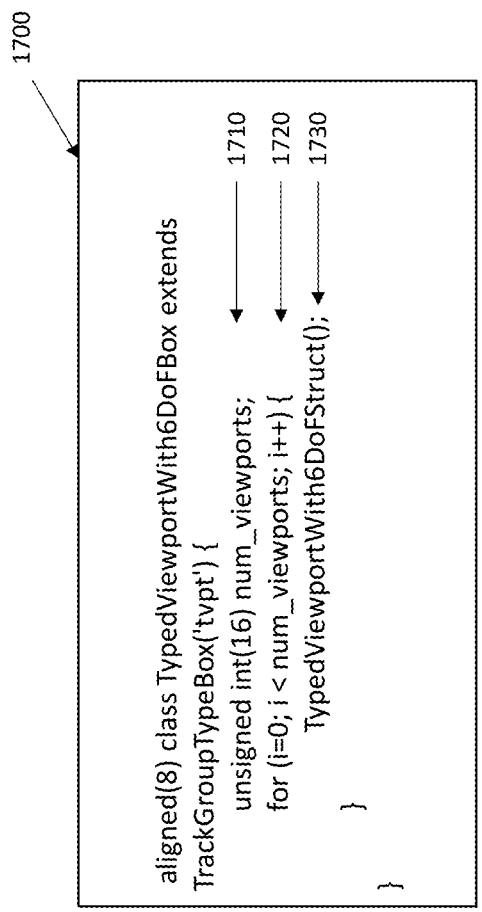
FIG. 17 shows exemplary syntax that can be used to signal static in a track grouping box of each media track within a track group of media tracks, according to some embodiments.

According to some embodiments, static viewports can be additionally or alternatively signaled in a track grouping box of each media track within a track group of media tracks that contribute to the media content of the viewports. For example, FIG. 17 shows exemplary syntax 1700 that can be used to signal static in a track grouping box of each media track within a track group of media tracks, according to some embodiments. As described herein, the num_viewports field 1710 may indicate the number of viewports in the point cloud. For each of the viewports (e.g., 1720), a typed viewport structure 1730 is called. The typed viewport structure 1730 may have a structure such as those specified in relation with FIGS. 12A and 12B. It may be desirable to signal the viewports in track group boxes if, for example, the media content is divided into a number of tracks (or the media content is carried in more than one track). For example, referring to FIG. 5, the 3D bounding boxes 506, 508 and 510 can be carried in separate tracks. In such examples, the object can be viewed from an associated position or angle, so the viewport information could come from multiple tracks. As a result, it can be desirable to put the viewport into the track group box for each video track.

According to some embodiments, dynamic viewports can be signaled in timed media tracks (e.g., using the sample entry and samples described herein), which can then be associated with media tracks or media track groups that provide media content of the dynamic viewports. For example, FIG. 18 shows exemplary sample entry syntax 1800 that can be used to signal dynamic viewports in timed media tracks, according to some embodiments (e.g. such as the data structures described in m52974 and m53395). As shown, the sample entry type is '6dvp,' the container is a sample description box ('stsd'), the sample entry is not mandatory, and therefore zero or one can be included. The structure may include a reserved bit 1802, position_included_flag 1803, orientation_included_flag 1804, range_included_flag 1805, shape_type 1806 and a typed viewport structure 1807. The viewport with 6DoF structure 1807 takes as input the following flags: position_included_flag 1808, orientation_included_flag 1809, range_included_flag 1810, shape_type 1811, and interpolate_included_flag 1812. Shape_type parameter 1811 may be 0 or 1 for 2D shape of field of view.

Figure 19:
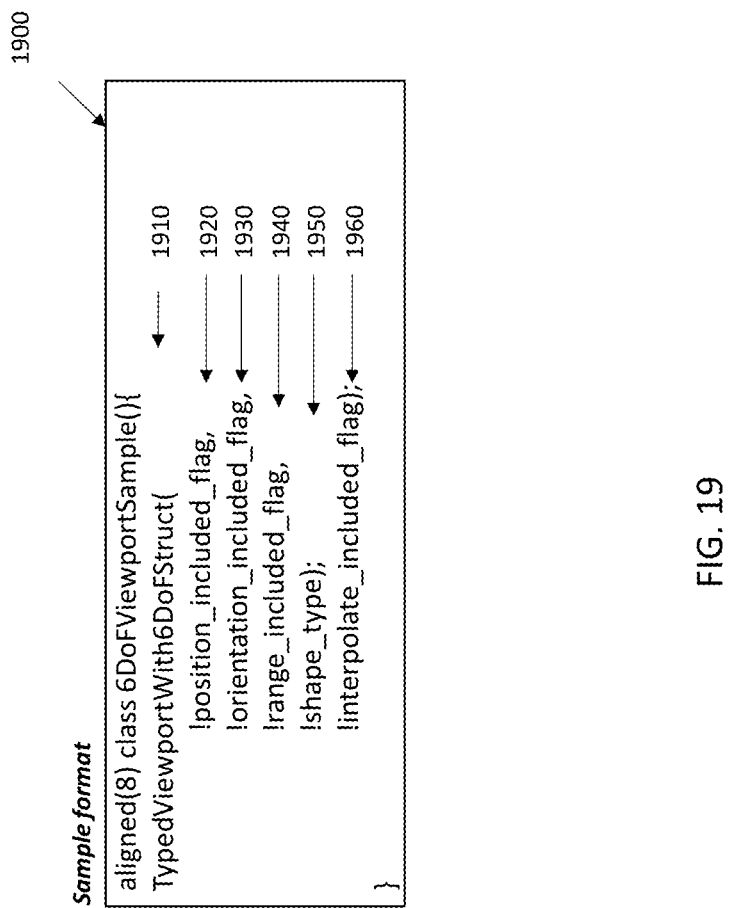
FIG. 19 shows an exemplary sample format syntax that can be used to signal dynamic viewports in timed media tracks, according to some embodiments.

For example, FIG. 19 shows exemplary syntax 1900 that can be used to signal dynamic viewports in timed media tracks, according to some embodiments. Structure 1900 may include a viewport with 6DoF structure 1910 that takes as input the following flags: !position_included_flag 1920, !orientation_included_flag 1930, !range_included_flag 1940, !shape_type 1950, and !interpolate_included_flag 1960.

In some embodiments, the interpolate field may indicate the continuity in time of the successive samples. For example, when the interpolate field is true, the application may linearly interpolate values of the ROI coordinates between the previous sample and the current sample. In some examples, when the interpolate field is false, there may not be any interpolation of values between the previous and the current samples. In some examples, when using interpolation, it may be expected that the interpolated samples match the presentation time of the samples in the referenced track. For instance, for each video sample of a video track, one interpolated 2D Cartesian coordinate sample is calculated.

According to some embodiments, similar sample entry and samples can be specified using the camera parameter based metadata data structures. For example, FIGS. 20 and 21 show exemplary syntax that can be used to specify sample entry and samples using the camera parameter based metadata data structures, according to some embodiments.

FIG. 20 shows exemplary syntax 2000 that can be used to specify sample entry and samples using the camera parameter based metadata data structures, according to some embodiments. As shown, the sample entry type is '6dvp,' the container is a sample description box ('stsd'), the sample entry is not mandatory, and therefore zero or one can be included. As described herein, the num_viewports field 2010 may indicate the number of viewports in the point cloud. For each of the viewports (e.g., 2020), a typed viewport structure 2030, TypedViewportWith6DoFStruct, is present. The typed viewport structure 2030 may have a structure such as those specified in relation with FIGS. 12A and 12B.

FIG. 21 shows exemplary syntax 2100 that can be used to specify sample entry and samples using the camera parameter based metadata data structures, according to some embodiments. As described herein, the num_viewports field 2110 may indicate the number of viewports in the point cloud. For each of the viewports (e.g., 2120), a typed viewport structure 2130 is called. The typed viewport structure 2130 may have a structure such as those specified in relation with FIGS. 12A and 12B.

According to some embodiments, user-selected viewports can be signaled within client feedback messages. For example, in some embodiments viewport parameters can be added for signaling, such as with the addition of viewport_type and viewport_description to the table 2200 of FIG. 22 (e.g. as described in m50655). For example, the parameter SelectedViewport 2202 may be an Object type with cardinality 1 and may include other parameters timestamp 2204, viewport_id 2206, viewport_type 2208, viewport_description 2210, center_azimuth 2212, center_elevation 2214, center_tilt 2216, azimuth_range 2218, elevation_range 2220, width_range 2222, height_range 2224, center__x 2226, center__y 2228, center__z 2230, object_id 2232, and context 2234. Timestamp 2204 is of type date-time and of cardinality 1 and may indicate Wall-clock time corresponding to the signaled viewport values. Parameter viewport_id 2206 is of type 'Int' (e.g. integer type) and of cardinality 1 and may be an identifier associated with the signaled viewport. Parameter viewport_type 2208 is of type 'Int' (e.g. integer type) and cardinality 1 and may indicate the type of the viewport. As described herein, viewport_type 2208 may have values corresponding to types as described with relation to FIG. 11. Parameter viewport_description 2210 is of type 'String' (e.g. string type) and cardinality 1 and may be a null-terminated UTF-8 string that provides a textual description of the viewport.

Parameter center_azimuth 2212 is of type 'Int' (e.g. integer type) with a range of $[-180*2^{-16}, 180*2^{-16}]$ and cardinality of 1. The center_azimuth 2212 may specify the azimuth of the center_point of the viewport position in units of $2^{-16}$ degrees relative to the global coordinate axes. According to some embodiments, when not present, center_azimuth 2212 is inferred to be equal to 0. Parameter center_elevation 2214 is of type 'Int' (e.g. integer type) with a range of $[-90*2^{-16}, 90*2^{-16}]$ and cardinality 1. The parameter may specify the elevation of the center_point of the viewport position in units of 2-16 degrees relative to the global coordinate axes. In some embodiments, when not present, the center_elevation 2214 is inferred to be equal to 0. Parameter center_tilt 2216 is of type 'Int' (e.g. integer type) with a range of $[-180*2^{-16}, 180*2^{-16}]$ and cardinality 1. The parameter may specify the tilt angle of the viewport position, in units of $2^{-16}$ degrees, relative to the global coordinate axes. In some embodiments, when not present, center_tilt 2216 is inferred to be equal to 0.

Parameter azimuth_range 2218 is of type 'Int' (e.g., integer type) and cardinality 0.1. The parameter azimuth_range 2218 may specify the azimuth range of the sphere region through the centre point of the sphere region in units of $2^{-16}$ degrees. In some embodiments, when not present, azimuth_range 2218 is inferred to be equal to $360*2^{16}$. The parameter azimuth_range 2218 may only be relevant for 3D viewports. Parameter elevation_range 2220 is of type 'Int' (e.g. integer type) and cardinality 0.1. The parameter elevation_range 2220 may specify the elevation range of the sphere region through the centre point of the sphere region in units of $2^{-16}$ degrees. In some embodiments, when not present, elevation_range 2220 is inferred to be equal to $180*2^{16}$. The parameter elevation_range 2220 may only be relevant for 3D viewports.

Parameter width_range 2222 is of type 'Int' (e.g., integer type) and cardinality 0.1. The parameter width_range 2222 may specify the width range of the rectangular region through its center_point. The parameter width_range 2222 may only be relevant for 2D viewports. Parameter height_range 2224 is of type 'Int' (e.g., integer type) and cardinality 0.1. The parameter height_range 2224 may specify the height range of the rectangular region through its center_point. The parameter height_range 2224 may only be relevant for 2D viewports.

Parameter center_x 2226 is of type 'Int' (e.g., integer type) and cardinality 1. For example, parameter center_x 2226 may be an integer in decimal representation expressing the x-coordinate of the center_point of the sphere or plane containing the viewport in arbitrary units. Parameter center_y 2228 is of type 'Int' (e.g., integer type) and cardinality 1. For example, parameter center_y 2228 may be an integer in decimal representation expressing the y-coordinate of the center_point of the sphere or plane containing the viewport in arbitrary units. Parameter center_z 2230 is of type 'Int' (e.g. integer type) and cardinality 1. For example, parameter center_z 2230 may be an integer in decimal representation expressing the z-coordinate of the center_point of the sphere or plane containing the viewport in arbitrary units.

Parameter object_id 2232 is of type 'Int' (e.g., integer type) and cardinality 0.1. The parameter object_id 2232 may be an Integer expressing the object ID associated with the viewport. Object ID information may or may not be signaled in conjunction with the viewport coordinate information. Parameter context 2234 is of type 'String' (e.g., string type) and cardinality 0.1. The parameter context 2234 may be a String describing the contextual information associated with the viewport, e.g., "ball", "player X", etc. Context information may or may not be signaled in conjunction with the viewport coordinate information.

Figure 23:
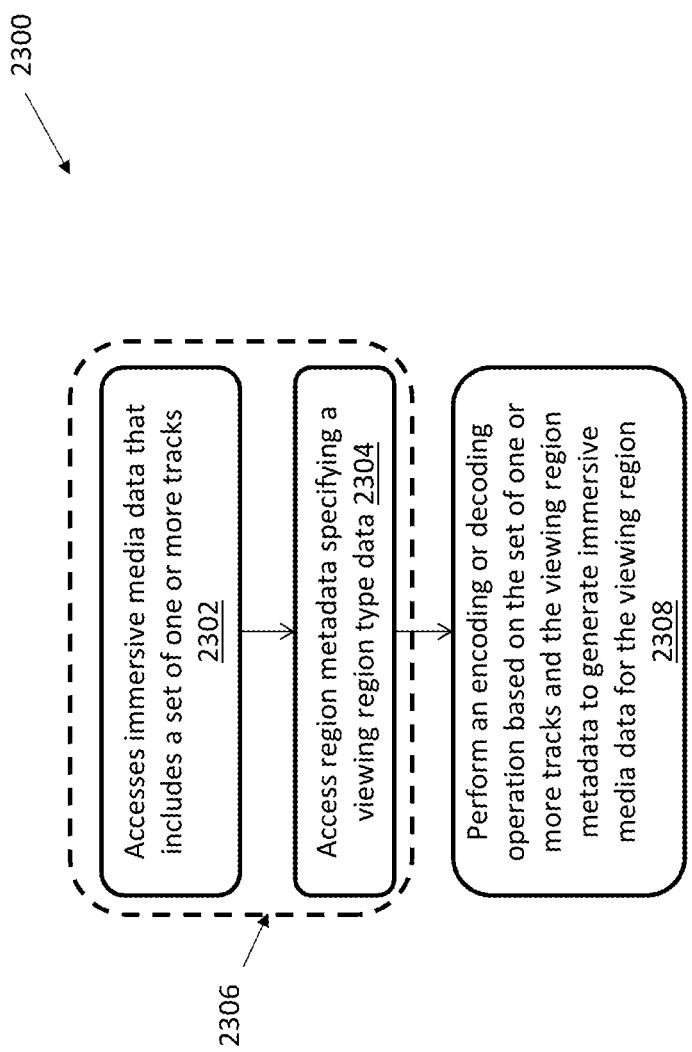
FIG. 23 is a flowchart of an exemplary process for encoding or decoding video data for immersive media, according to some embodiments.

FIG. 23 is an exemplary diagram of a computerized method 2300 for encoding or decoding video data for immersive media, according to some embodiments. At steps 2302 and 2304, the computing device (e.g., the encoding device 104 and/or the decoding device 110) accesses immersive media data that includes a set of one or more tracks (step 2302) and region metadata specifying a viewing region type data (step 2304). At step 2308, the computing device performs an encoding or decoding operation based on the set of one or more tracks and the viewing region metadata to generate immersive media data for the viewing region.

Steps 2302 and 2304 are shown in the dotted box 2306 to indicate that steps 2302 and 2304 can be performed separately and/or at the same time. Each track received at step 2302 can include associated encoded immersive media data that corresponds to an associated spatial portion of immersive media content that is different than the associated spatial portions of other tracks received at step 2302.

Referring to the region metadata received at step 2304, the region metadata may specify the viewing region data type within a data structure attribute of the metadata (e.g., a data structure name). In some examples, the region metadata may specify a first type of a viewing region and a second type of a viewing region. For example, the first type may be a main type and a second type may be a secondary type. The first and second types may be specified in one or more attributes of the region metadata, in one or more data structure attributes (e.g., data structure names) of the metadata, and/or any combination. In some embodiments, the viewing region is a sub-portion of the full viewable immersive media data. The viewing region can be, for example, a viewport.

In some embodiments, the computerized method 2300 for decoding video data for immersive media may further include determining a first type of the viewing region based on the first viewing region type data. For example, if the viewing region type data is specified by a data structure attribute of the metadata specifying a viewing region, determining the first type of the viewing region includes reading the data structure attribute (e.g., the data structure name, data structure type, etc.). In some examples, if the viewing region type data is specified by an attribute of the metadata specifying a viewing region, determining the first type of the viewing region includes reading the attribute of the metadata.

Referring to the region metadata received at step 2304, the region metadata may further include second viewing region type data indicating a second type of a second viewing region. In some examples, the first viewing region type data and the second viewing region type is specified by first data structure attribute of the metadata specifying the viewing region and a second data structure attribute of the metadata specifying the second viewing region and determining the first type of the viewing region includes reading the first data structure attribute and determining the second type of the second viewing region includes reading the second data structure attribute. In some examples, the first viewing region type is specified by a data structure attribute of the metadata specifying the viewing region; and the second viewing region type data is specified by an attribute of the metadata specifying a viewing region; and determining the first type of the viewing region includes reading the data structure attribute and determining the second type of the second viewing region includes reading the attribute of the metadata.

In some embodiments, the computerized method 2300 for decoding video data for immersive media may further include determining a second type of the second viewing region. In some examples, determining the first and/or second type of the viewing region includes determining the viewing region is of a recommended type, indicating that the viewport is suggested by a content provider and/or editor. In some examples, determining the first and/or type of the viewing region includes determining the viewing region is of an initial type, indicating that the viewport is an initial viewport for playback. In some examples, determining the first and/or type of the viewing region comprises determining the viewing region is of a popular type, indicating that the viewport is recommended by viewers or is determined to be popular among viewers. In some examples, determining the first and/or type of the viewing region includes determining the viewing region is of a user-selected type, indicating that the viewport is selected by a viewer.

In some embodiments, the techniques described herein can be performed by an encoder and/or a decoder. For example, an encoder can generate and/or encode one or more bitstreams according to the techniques described herein. As another example, a decoder can be configured to decode one or more bitstreams encoded according to the techniques described herein. In some embodiments, the techniques described herein provide for an encoded bitstream (e.g., which includes immersive media data in one or more tracks and region metadata specifying viewing region type data).

Various exemplary syntaxes and use cases are described herein, which are intended for illustrative purposes and not intended to be limiting. It should be appreciated that only a subset of these exemplary fields may be used for a particular aspect and/or other fields may be used, and the fields need not include the field names used for purposes of description herein. For example, the syntax may omit some fields and/or may not populate some fields (e.g., or populate such fields with a null value). As another example, other syntaxes and/or classes can be used without departing from the spirit of the techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data for three-dimensional (3D) immersive media, the method comprising:
   accessing immersive media data comprising:
      a set of one or more tracks, wherein each track of the set comprises associated to-be-decoded immersive media data that corresponds to an associated spatial portion of immersive media content that is different than the associated spatial portions of other tracks in the set of tracks; and
      metadata specifying a six degree of freedom (6DoF) viewing region in the immersive media content, wherein the metadata comprises first viewing region type data indicating a type of the viewing region; and
   performing a decoding operation based on the set of one or more tracks and the viewing region metadata to generate decoded immersive media data for the viewing region;
   wherein the metadata further comprises second viewing region type data indicating a second type of a second viewing region;
   wherein the first viewing region type data and the second viewing region type data are specified, respectively, by a first data structure attribute of the metadata specifying the viewing region and a second data structure attribute of the metadata specifying the second viewing region.

2. The decoding method of claim 1, wherein the viewing region comprises a sub-portion of the viewable immersive media data that is less than a full viewable portion of the immersive media data.

3. The decoding method of claim 2, wherein the viewing region comprises a viewport.

4. The decoding method of claim 1, wherein performing the decoding operation further comprises determining a type of the viewing region based on the first viewing region type data.

5. The decoding method of claim 1,
wherein the first viewing region type data is specified by a data structure attribute of the metadata specifying the viewing region; and
determining the type of the viewing region comprises reading the data structure attribute.

6. The decoding method of claim 1, wherein:
determining the type of the viewing region comprises reading the first data structure attribute and determining the second type of the second viewing region comprises reading the second data structure attribute.

7. The decoding method of claim 1, wherein performing the decoding operation further comprises determining the second type of the second viewing region.

8. The decoding method of claim 1, wherein determining the type of the viewing region comprises determining the viewing region of a recommended type.

9. The decoding method of claim 1, wherein determining the type of the viewing region comprises determining the viewing region of an initial type indicating that the viewport is an initial viewport for playback.

10. The decoding method of claim 1, wherein determining the type of the viewing region comprises determining the viewing region of a popular type.

11. The decoding method of claim 1, wherein determining the type of the viewing region comprises determining the viewing region of a user-selected type indicating that the viewport is selected by a viewer.

12. The decoding method of claim 1, wherein the immersive media data further comprises the six degree of freedom (6DoF) viewing region.

13. A method for encoding video data for three-dimensional (3D) immersive media, the method comprising:
encoding immersive media data, comprising encoding at least:
a set of one or more tracks, wherein each track of the set comprises associated to-be-decoded immersive media data that corresponds to an associated spatial portion of immersive media content that is different than the associated spatial portions of other tracks in the set of tracks; and
metadata specifying a six degree of freedom (6DoF) viewing region in the immersive media content, wherein the metadata comprises first viewing region type data indicating a type of the viewing region,
wherein the to-be-decoded immersive media data can be used to perform a decoding operation based on the set of one or more tracks and the viewing region metadata to generate decoded immersive media data for the viewing region;
wherein the metadata further comprises second viewing region type data indicating a second type of a second viewing region;
wherein the first viewing region type data and the second viewing region type data are specified, respectively, by a first data structure attribute of the metadata specifying the viewing region and a second data structure attribute of the metadata specifying the second viewing region.

14. The encoding method of claim 13, wherein the immersive media data further comprises the six degree of freedom (6DoF) viewing region.

15. An apparatus configured to decode video data for three-dimensional (3D) immersive media, the apparatus comprising a processor in communication with memory, the processor being configured to execute instructions stored in the memory that cause the processor to perform:
accessing immersive media data comprising:
a set of one or more tracks, wherein each track of the set comprises associated to-be-decoded immersive media data that corresponds to an associated spatial portion of immersive media content that is different than the associated spatial portions of other tracks in the set of tracks; and
metadata specifying a six degree of freedom (6DoF) viewing region in the immersive media content, wherein the metadata comprises first viewing region type data indicating a type of the viewing region;
performing a decoding operation based on the set of one or more tracks and the viewing region metadata to generate decoded immersive media data for the viewing region;
wherein the metadata further comprises second viewing region type data indicating a second type of a second viewing region;
wherein the first viewing region type data and the second viewing region type data are specified, respectively, by a first data structure attribute of the metadata specifying the viewing region and a second data structure attribute of the metadata specifying the second viewing region.

16. The apparatus of claim 15, wherein the immersive media data further comprises the six degree of freedom (6DoF) viewing region.

* * * * *